US012228795B2

(12) United States Patent
Park et al.

(10) Patent No.: US 12,228,795 B2
(45) Date of Patent: Feb. 18, 2025

(54) IMAGING LENS SYSTEM

(71) Applicant: SAMSUNG ELECTRO-MECHANICS CO., LTD., Suwon-si (KR)

(72) Inventors: Il Yong Park, Suwon-si (KR); Jong Gi Lee, Suwon-si (KR); Dong Hyuk Jang, Suwon-si (KR); Han Ul Youn, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 443 days.

(21) Appl. No.: 17/592,873

(22) Filed: Feb. 4, 2022

(65) Prior Publication Data
US 2023/0108264 A1    Apr. 6, 2023

(30) Foreign Application Priority Data

Oct. 5, 2021 (KR) .................... 10-2021-0131852

(51) Int. Cl.
*G02B 9/64* (2006.01)
*G02B 13/00* (2006.01)

(52) U.S. Cl.
CPC .......... *G02B 9/64* (2013.01); *G02B 13/0045* (2013.01)

(58) Field of Classification Search
CPC ............................ G02B 9/64; G02B 13/0045
See application file for complete search history.

(56) References Cited

U.S. PATENT DOCUMENTS

| 8,599,495 | B1 | 12/2013 | Tsai et al. |
| 11,808,919 | B2 | 11/2023 | Park et al. |
| 2019/0004285 | A1* | 1/2019 | Tang ........................ G02B 9/64 |
| 2019/0278062 | A1 | 9/2019 | Chen |
| 2019/0346663 | A1* | 11/2019 | Tang ........................ G02B 9/64 |
| 2019/0361202 | A1* | 11/2019 | Chang ...................... G02B 9/64 |
| 2020/0355890 | A1* | 11/2020 | Kong ................. G02B 13/0045 |
| 2020/0409089 | A1* | 12/2020 | Sun ........................ G02B 13/06 |
| 2021/0063696 | A1 | 3/2021 | Kamada et al. |
| 2021/0072507 | A1 | 3/2021 | Huang |
| 2021/0149166 | A1 | 5/2021 | Zhang et al. |

(Continued)

FOREIGN PATENT DOCUMENTS

| CN | 111413784 A | 7/2020 |
| CN | 211043777 U | 7/2020 |

(Continued)

OTHER PUBLICATIONS

Chinese Office Action issued on Aug. 4, 2022, in counterpart Chinese Patent Application No. 202220908814.5 (3 pages in English and 2 pages in Chinese).

(Continued)

*Primary Examiner* — Christopher Stanford
*Assistant Examiner* — Journey F Sumlar
(74) *Attorney, Agent, or Firm* — NSIP Law

(57) ABSTRACT

An imaging lens system includes: a first lens, a second lens, a third lens, a fourth lens, a fifth lens, a sixth lens, and a seventh lens sequentially disposed from an object side. The fourth lens has negative refractive power and the fifth lens has negative refractive power, and a ratio (TTL/2ImgHT) between a distance (TTL) from an object-side surface of the first lens to an imaging plane and a diagonal length (2ImgHT) of the imaging plane is 0.6 or less.

17 Claims, 16 Drawing Sheets

(56) References Cited

U.S. PATENT DOCUMENTS

| | | | |
|---|---|---|---|
| 2021/0157104 A1 | 5/2021 | Jung et al. | |
| 2021/0223515 A1* | 7/2021 | Tseng | G02B 9/64 |
| 2021/0247593 A1 | 8/2021 | Chang et al. | |
| 2021/0255428 A1 | 8/2021 | Lin et al. | |
| 2021/0263282 A1 | 8/2021 | Zhou | |
| 2021/0356698 A1 | 11/2021 | Zhang et al. | |
| 2021/0382273 A1 | 12/2021 | Park et al. | |
| 2022/0163776 A1 | 5/2022 | Chen et al. | |

FOREIGN PATENT DOCUMENTS

| | | |
|---|---|---|
| CN | 211086744 U | 7/2020 |
| CN | 112346214 A | 2/2021 |
| CN | 112526714 A | 3/2021 |
| CN | 213715586 U | 7/2021 |
| CN | 217085392 U | 7/2022 |
| TW | 201403166 A | 1/2014 |
| TW | 201939093 A | 10/2019 |
| TW | 202120996 A | 6/2021 |
| TW | I739599 B | 9/2021 |

OTHER PUBLICATIONS

Taiwanese Office Action issued on Feb. 6, 2024, in counterpart Taiwanese Patent Application No. 112120550 (5 pages in English, 5 pages in Chinese).

Taiwanese Office Action issued on Oct. 5, 2022, in counterpart Taiwanese Patent Application No. 111106411 (5 Pages in English and 6 pages in Chinese).

Korean Office Action issued on Mar. 8, 2024, in counterpart Korean Patent Application No. 10-2021-0131852 (8 pages in English, 6 pages in Korean).

Korean Office Action issued on Nov. 20, 2024, in counterpart Korean Patent Application No. 10-2021-0131852 (6 pages in English, 5 pages in Korean).

* cited by examiner

IMAGING LENS SYSTEM

CROSS-REFERENCE TO RELATED APPLICATION

This application claims the benefit under 35 USC 119(a) of Korean Patent Application No. 10-2021-0131852, filed on Oct. 5, 2021 with the Korean Intellectual Property Office, the entire disclosure of which is incorporated herein by reference for all purposes.

BACKGROUND

The following description relates to an imaging lens system that may be mounted in a portable electronic device.

A portable electronic device includes a camera module for capturing images or videos. For example, the camera module may be mounted in a mobile phone, a notebook computer, a game machine, or the like.

Resolution of a camera module and an imaging lens system may be proportional to a size of a sensor and an imaging plane. For example, in order to implement a camera module and an imaging lens system having high resolution, a sensor and an imaging plane having a considerable size are required. However, since the size (or length) of the camera module and the imaging lens system increases in proportion to the size of the sensor and the imaging plane, it is difficult for a camera module and imaging lens system having high resolution to be mounted in a thinned electronic device such as a smartphone.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes: a first lens, a second lens, a third lens, a fourth lens, a fifth lens, a sixth lens, and a seventh lens sequentially disposed from an object side. The fourth lens has negative refractive power and the fifth lens has negative refractive power, and a ratio (TTL/2ImgHT) between a distance (TTL) from an object-side surface of the first lens to an imaging plane and a diagonal length (2ImgHT) of the imaging plane is 0.6 or less.

The fourth lens may include a concave image-side surface.

The fifth lens may include a convex object-side surface.
The fifth lens may include a concave image-side surface.
The sixth lens may have a convex image-side surface.
The third lens may have positive refractive power.
The sixth lens may have positive refractive power.

The imaging lens system may satisfy $-4.0<f2/f<-1.0$, where f is a focal length of the imaging lens system, and f2 is a focal length of the second lens.

The imaging lens system may satisfy $3.0<f3/f$, where f is a focal length of the imaging lens system, and f3 is a focal length of the third lens.

The imaging lens system may satisfy $f4/f<-3.0$, where f is a focal length of the imaging lens system, and f4 is a focal length of the fourth lens.

The imaging lens system may satisfy $TTL/f<1.2$, where f is a focal length of the imaging lens system.

In another general aspect, an imaging lens system includes: a first lens, a second lens, a third lens, a fourth lens, a fifth lens, a sixth lens, and a seventh lens sequentially disposed from an object side. The fourth lens includes a concave image-side surface, and a ratio (TTL/2ImgHT) between a distance (TTL) from an object-side surface of the first lens to an imaging plane and a diagonal length (2ImgHT) of the imaging plane is 0.6 or less.

The imaging lens system may satisfy $-9.0<f4/f<-3.0$, where f is a focal length of the imaging lens system, and f4 is a focal length of the fourth lens.

The imaging lens system may satisfy $-5.0<f5/f<-1.0$, where f is a focal length of the imaging lens system, and f5 is a focal length of the fifth lens.

The imaging lens system may satisfy $0.84<D23/D34<0.96$, where D23 is a distance from an image-side surface of the second lens to an object-side surface of the third lens, and D34 is a distance from an image-side surface of the third lens to an object-side surface of the fourth lens.

The imaging lens system may satisfy $0.60<D56/D67<0.70$, where D56 is a distance from an image-side surface of the fifth lens to an object-side surface of the sixth lens, and D67 is a distance from an image-side surface of the sixth lens to an object-side surface of the seventh lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
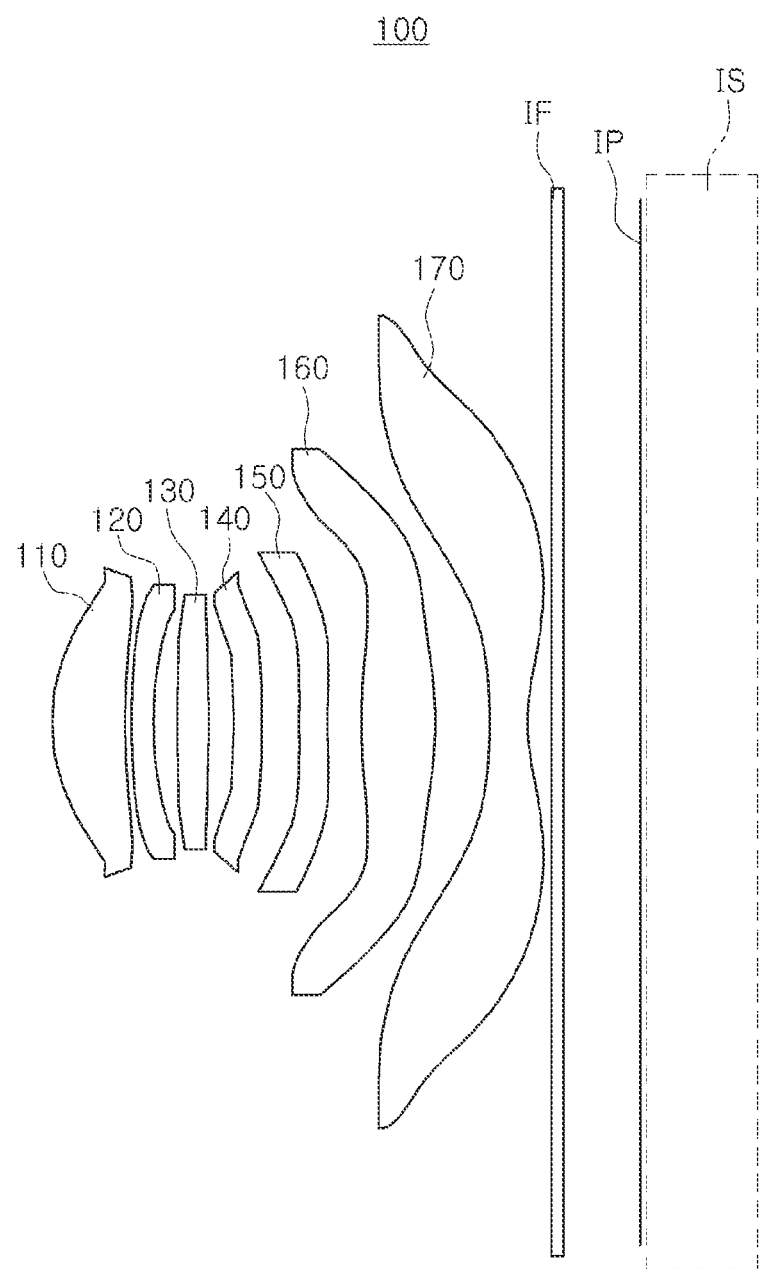
FIG. 1 is a block diagram of an imaging lens system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the following description, a first lens refers to a lens closest to an object (or a subject), and a seventh lens refers to a lens closest to an imaging plane (or an image sensor). In the following description, a curvature of radius, a thickness, TTL (a distance from an object-side surface of the first lens to an imaging plane), 2ImgHT (a diagonal length of the imaging plane), ImgHT (½ of 2ImgHT), and a focal length of the lens may be represented in millimeters (mm).

The thickness of the lens, an interval between the lenses, and the TTL is a distance from an optical axis of the lens. In addition, in an explanation of a shape of each lens, a convex shape on one surface may mean that a paraxial region of the surface is convex, and a concave shape on one surface may mean that a paraxial region of the surface is concave. Therefore, even when one surface of the lens is described as having a convex shape, an edge portion of the lens may be concave. Similarly, even when one surface of the lens is described as having a concave shape, an edge portion of the lens may be convex.

The various imaging lens systems described herein may be configured to be mounted in a portable electronic device. For example, the imaging lens system may be mounted in a smartphone, a notebook computer, an augmented reality device, a virtual reality device (VR), a portable game machine, or the like. However, the range and examples of use of the imaging lens system described herein are not limited to the above-described electronic device. For example, the optical imaging system may provide a narrow mounting space, but may be applied to an electronic device requiring high-resolution imaging.

An imaging lens system according to a the various examples may include a plurality of lenses. For example, the imaging lens system may include a first lens, a second lens, a third lens, a fourth lens, a fifth lens, a sixth lens, and a seventh lens sequentially disposed from an object side.

In the imaging lens system, a length of the imaging lens system (a distance from an object-side surface of the first lens to an imaging plane (TTL)) and a diagonal length of the imaging plane (2ImgHT) may form a predetermined numerical relationship. For example, in the imaging lens system, TTL/2ImgHT may be 0.6 or less. In addition, the imaging lens system may include two or more lenses having negative refractive power. For example, the imaging lens system may include a fourth lens having negative refractive power and a fifth lens having negative refractive power.

An imaging lens system according to the various examples may include a plurality of lenses. For example, the imaging lens system may include a first lens, a second lens, a third lens, a fourth lens, a fifth lens, a sixth lens, and a seventh lens, sequentially disposed from an object side. In the imaging lens system, TTL/2ImgHT of 0.6 or less. In addition, the imaging lens system may include a lens having a concave surface. For example, the imaging lens system may include a fourth lens having a concave image-side surface.

An imaging lens system according to the various examples may satisfy at least one of the following conditional expressions.

$$TTL/2ImgHT 0.6$$

$$0<f1/f<1.8$$

$$25<V1-V2<45$$

$$V1-V3<35$$

$$15<V1-V5$$

$$-4.0<f2/f<-1.0$$

$$3.0<f3/f$$

$$f4/f<-3.0$$

$$-5.0<f5/f$$

$$0<f6/f$$

$$f7/f<0$$

$$TTL/f<1.2$$

$$|f1/f2|<1.0$$

$$-2.0<f2/f3<0$$

$$BFL/f<0.3$$

$$D12/f<0.1$$

In the above conditional expressions, f is a focal length of the imaging lens system, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, BFL is a distance from an image-side surface of the seventh lens to an imaging plane, V1 is an Abbe number of the first lens, V2 is an Abbe number of the second lens, V3 is an Abbe number of the third lens, V5 is an Abbe number of the fifth lens, and D12 is a distance from an image-side surface of the first lens to an object-side surface of the second lens.

The imaging lens system according to the various examples may satisfy some of the above-described conditional expressions in a more limited form as follows.

$$0.5<TTL/2ImgHT<0.6$$

$$30<V1-V3<35$$

$$30<V1-V5<35$$

$$3.0<f3/f<6.0$$

$$-9.0<f4/f<-3.0$$

$$-5.0<f5/f<-1.0$$

$$0.4<f6/f<1.0$$

$$-1.0<f7/f<-0.3$$

$$1.1<TTL/f<1.2$$

$$0.1<|f1/f2|<0.4$$

$$0.1<BFL/f<0.3$$

$$0.01<D12/f<0.1$$

An imaging lens system according to the various examples may satisfy at least one of the following conditional expressions.

$$0.23<D12/D23<0.36$$

$$0.84<D23/D34<0.96$$

$$D56/D67<0.70$$

In the above conditional expressions, D23 is a distance from an image-side surface of the second lens to an object-side surface of the third lens, D34 is a distance from an image-side surface of the third lens to an object-side surface of the fourth lens, D56 is a distance from an image-side surface of the fifth lens to an object side-surface of the sixth lens, and D67 is a distance from an image-side surface of the sixth lens to an object-side surface of the seventh lens.

The imaging lens system according to the various examples may include one or more lenses having the following characteristics, if necessary.

The first lens has refractive power. The first lens includes a spherical surface or an aspherical surface. For example, both surfaces of the first lens may be aspherical. The first lens may be formed of a material having high light transmittance and excellent workability. For example, the first lens may be formed of a plastic material or a glass material. The first lens may be configured to have a high refractive index. For example, the refractive index of the first lens may be lower than 1.6. As a specific example, the refractive index of the first lens may be greater than 1.52 and lower than 1.56. The first lens may have a predetermined Abbe number. For example, the Abbe number of the first lens may be greater than 50. As a specific example, the Abbe number of the first lens may be greater than 53 and lower than 58.

The second lens has refractive power. The second lens includes a spherical surface or an aspherical surface. For example, both surfaces of the second lens may be aspherical. The second lens may be formed of a material having high light transmittance and excellent workability. For example, the second lens may be formed of a plastic material or a glass material. The second lens may be configured to have a high refractive index. For example, the refractive index of the second lens may be greater than 1.6. As a specific example, the refractive index of the second lens may be greater than 1.65 and lower than 1.70. The second lens may have a predetermined Abbe number. For example, the Abbe number of the second lens may be less than 30. As a specific example, the Abbe number of the second lens may be greater than 16 and lower than 23.

The third lens has refractive power. The third lens includes a spherical surface or an aspherical surface. For example, both surfaces of the third lens may be aspherical. The third lens may be formed of a material having high light transmittance and excellent workability. For example, the third lens may be formed of a plastic material or a glass material. The third lens may be configured to have a high refractive index. For example, the refractive index of the third lens may be greater than 1.5. As a specific example, the refractive index of the third lens may be greater than 1.52 and lower than 1.67.

The fourth lens has refractive power. For example, the fourth lens may have negative refractive power. One surface of the fourth lens may be concave. For example, the fourth lens may have a concave image-side surface. The fourth lens includes a spherical surface or an aspherical surface. For example, both surfaces of the third lens may be aspherical. The fourth lens may be formed of a material having high light transmittance and excellent workability. For example, the fourth lens may be formed of a plastic material or a glass material. The fourth lens may be configured to have a high refractive index. For example, the refractive index of the fourth lens may be greater than 1.6. As a specific example, the refractive index of the fourth lens may be greater than 1.65 and lower than 1.70. The fourth lens may have a predetermined Abbe number. For example, the Abbe number of the fourth lens may be less than 30. As a specific example, the Abbe number of the fourth lens may be greater than 16 and lower than 23.

The fifth lens has refractive power. For example, the fifth lens may have negative refractive power. One surface of the fifth lens may be convex. For example, the fifth lens may have a convex object-side surface. One surface of the fifth lens may be concave. For example, the fifth lens may have a concave image-side surface. The fifth lens includes a spherical surface or an aspherical surface. For example, both surfaces of the fifth lens may be aspherical. An inflection point may be formed on one or both surfaces of the fifth lens. For example, an inflection point may be formed on the object-side surface and the image-side surface of the fifth lens. The fifth lens may be formed of a material having high light transmittance and excellent workability. For example, the fifth lens may be formed of a plastic material or a glass material. The fifth lens may be configured to have a predetermined refractive index. For example, the refractive index of the fifth lens may be greater than 1.5. As a specific example, the refractive index of the fifth lens may be greater than 1.56 and lower than 1.67. The fifth lens may have a predetermined Abbe number. For example, the Abbe number of the fifth lens may be greater than 20. As another example, the Abbe number of the fifth lens may be greater than 22 and lower than 40.

The sixth lens has refractive power. One surface of the sixth lens may be convex. For example, the sixth lens may have a convex image-side surface. The sixth lens includes a spherical surface or an aspherical surface. For example, both surfaces of the sixth lens may be aspherical. An inflection point may be formed on one or both surfaces of the sixth lens. For example, an inflection point may be formed on the object-side surface and the image-side surface of the sixth lens. The sixth lens may be formed of a material having high light transmittance and excellent workability. For example, the sixth lens may be formed of a plastic material or a glass material. The sixth lens may be configured to have a predetermined refractive index. For example, the refractive index of the sixth lens may be greater than 1.5. As a specific example, the refractive index of the sixth lens may be greater than 1.54 and lower than 1.60. The sixth lens may have a predetermined Abbe number. For example, the Abbe number of the sixth lens may be greater than 30. As a specific example, the Abbe number of the sixth lens may be greater than 34 and lower than 60.

The seventh lens has refractive power. The seventh lens includes a spherical surface or an aspherical surface. For example, both surfaces of the sixth lens may be aspherical. An inflection point may be formed on one or both surfaces of the seventh lens. For example, an inflection point may be formed on the object-side surface and the image-side surface of the seventh lens. The seventh lens may be formed of a material having high light transmittance and excellent workability. For example, the seventh lens may be formed of a plastic material or a glass material. The seventh lens may be configured to have a predetermined refractive index. For example, the refractive index of the sixth lens may be greater than 1.5. As a specific example, the refractive index of the seventh lens may be greater than 1.52 and lower than 1.57. The seventh lens may have a predetermined Abbe number. For example, the Abbe number of the seventh lens may be greater than 50. As a specific example, the Abbe number of the seventh lens may be greater than 53 and lower than 60.

The first to seventh lenses may include a spherical surface or an aspherical surface as described above. When the first to seventh lenses include an aspherical surface, the aspherical surface of the corresponding lens may be expressed by Equation 1 below.

$$Z = \frac{cY^2}{1 + \sqrt{1 - (1+K)c^2Y^2}} + AY^4 + BY^6 + CY^8 + DY^{10} + EY^{12} + FY^{14} + GY^{16} + HY^{18} \qquad \text{Equation 1:}$$

In Equation 1, c is a curvature of a lens surface and is equal to a reciprocal of a radius of curvature of the lens surface at an optical axis of the lens surface, K is a conic constant, Y is a distance from any point on the lens surface to the optical axis of the lens surface in a direction perpendicular to the optical axis of the lens surface, A to H are aspheric constants, and Z (also known as sag) is a distance in a direction parallel to the optical axis of the lens surface from the point on the lens surface at the distance Y from the optical axis of the lens surface to a tangential plane perpendicular to the optical axis and intersecting a vertex of the lens surface.

The imaging lens system according to the various examples may further include a stop and a filter. For example, the imaging lens system may further include a stop disposed on the object side of the first lens or between the lens and the lens. As another example, the imaging lens system may further include a filter disposed between the seventh lens and an imaging plane. The stop may be configured to adjust an amount of light incident in a direction of the imaging plane, and the filter may block light of a specific wavelength. For reference, the filter described herein is configured to block infrared rays, but light of a wavelength that is blocked through the filter is not limited to infrared rays.

Hereinafter, an imaging lens system according to various examples will be described with reference to the drawings.

First, an imaging lens system according to a first example will be described with reference to FIG. 1.

An imaging lens system 100 includes a first lens 110, a second lens 120, a third lens 130, a fourth lens 140, a fifth lens 150, a sixth lens 160, and a seventh lens 170.

The first lens 110 has positive refractive power, and has a convex object-side surface and a concave image-side surface. The second lens 120 has negative refractive power, and has a convex object-side surface and a concave image-side surface. The third lens 130 has positive refractive power, and has a convex object-side surface and a convex image-side surface. The fourth lens 140 has negative refractive power, and has a concave object-side surface and a concave image-side surface. The fifth lens 150 has negative refractive power, and has a convex object-side surface and a concave image-side surface. In addition, an inflection point is formed on the object-side surface and the image-side surface of the fifth lens 150. The sixth lens 160 has positive refractive power, and has a convex object-side surface and a convex image-side surface. In addition, an inflection point is formed on the object-side surface and the image-side surface of the sixth lens 160. The seventh lens 170 has negative refractive power, and has a concave object-side surface and a concave image-side surface. In addition, an inflection point is formed on the object-side surface and the image-side surface of the seventh lens 170.

The imaging lens system 100 may further include a filter IF and an imaging plane IP. The filter IF may be disposed between the seventh lens 170 and the imaging plane IP. The imaging plane IP may be formed in a position in which light incident from the first lens 110 to the seventh lens 170 is formed. For example, the imaging plane IP may be formed on one surface of an image sensor IS of the camera module or inside the image sensor IS.

Figure 2:
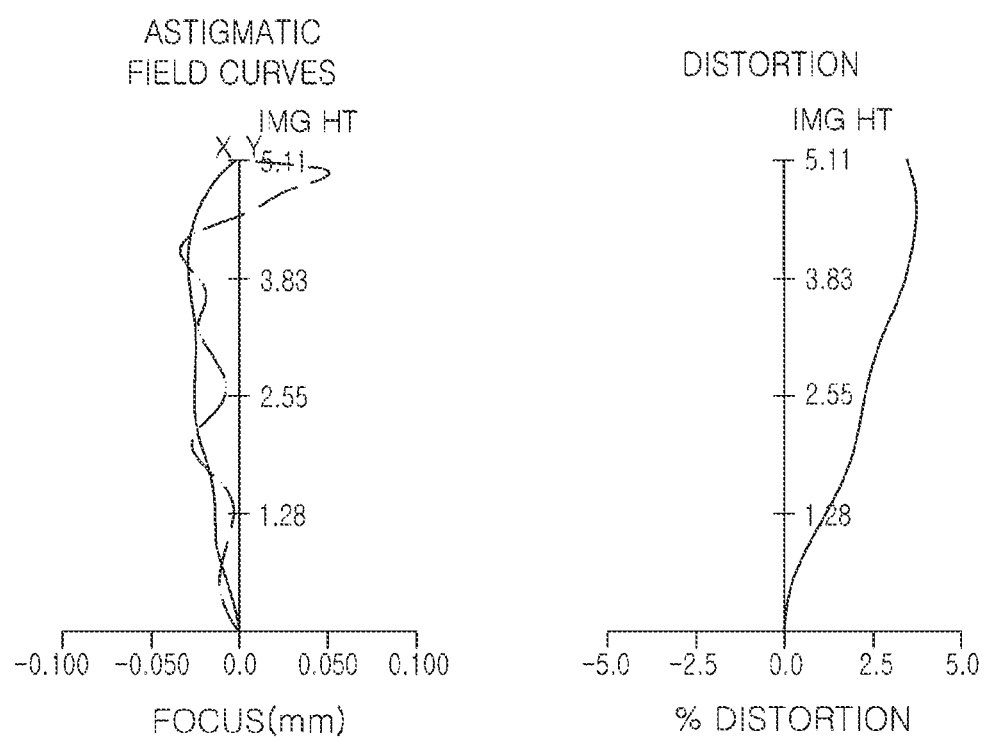
FIG. 2 is an aberration curve of the imaging lens system illustrated in FIG. 1.

The imaging lens system 100 configured as above exhibits aberration characteristics as illustrated in FIG. 2. Tables 1 and 2 illustrate lens characteristics and aspheric values of the imaging lens system 100.

TABLE 1

| Surface No. | Reference | Radius of curvature | Thickness/distance | Refractive index | Abbe number |
|---|---|---|---|---|---|
| S1 | First lens | 1.9113 | 0.718 | 1.546 | 56.0 |
| S2 | | 6.5617 | 0.060 | | |
| S3 | Second lens | 6.0575 | 0.220 | 1.689 | 18.2 |
| S4 | | 3.8485 | 0.235 | | |
| S5 | Third lens | 20.2062 | 0.307 | 1.537 | 55.7 |
| S6 | | −25.3838 | 0.250 | | |
| S7 | Fourth lens | −35.0542 | 0.273 | 1.679 | 19.2 |
| S8 | | 80.2463 | 0.373 | | |
| S9 | Fifth lens | 15.0035 | 0.277 | 1.641 | 24.0 |
| S10 | | 6.0549 | 0.339 | | |
| S11 | Sixth lens | 7.1176 | 0.723 | 1.570 | 37.4 |
| S12 | | −3.0458 | 0.533 | | |
| S13 | Seventh lens | −18.9611 | 0.380 | 1.537 | 55.7 |
| S14 | | 1.8285 | 0.238 | | |
| S15 | Filter | Infinity | 0.110 | 1.519 | 64.2 |
| S16 | | Infinity | 0.761 | | |
| S17 | Imaging plane | Infinity | 0.000 | | |

TABLE 2

| Surface No. | S1 | S2 | S3 | S4 | S5 | S6 | S7 |
|---|---|---|---|---|---|---|---|
| K | −1.99E+00 | −4.59E+01 | 1.53E+01 | 6.97E+00 | −1.00E+00 | −1.00E+00 | −1.00E+00 |
| 4th order coefficient | 3.34E−02 | −9.76E−03 | −3.72E−02 | −1.50E−02 | 1.31E−02 | −3.31E−02 | −1.21E−01 |
| 6th order coefficient | −1.20E−02 | 2.01E−02 | 2.36E−02 | −4.15E−02 | −3.58E−01 | 7.21E−02 | 4.93E−01 |
| 8th order coefficient | 9.00E−02 | −2.02E−01 | −4.22E−02 | 4.80E−01 | 3.50E+00 | 5.03E−02 | −3.25E+00 |
| 10th order coefficient | −3.36E−01 | 1.04E+00 | 4.11E−01 | −2.60E+00 | −2.25E+01 | −2.82E+00 | 1.40E+01 |
| 12th order coefficient | 7.45E−01 | −3.05E+00 | −1.60E+00 | 1.01E+01 | 9.88E+01 | 1.74E+01 | −4.11E+01 |
| 14th order coefficient | −1.07E+00 | 5.78E+00 | 3.66E+00 | −2.94E+01 | −3.06E+02 | −5.84E+01 | 8.42E+01 |
| 16th order coefficient | 9.91E−01 | −7.51E+00 | −5.63E+00 | 6.38E+01 | 6.80E+02 | 1.27E+02 | −1.22E+02 |
| 18th order coefficient | −5.46E−01 | 6.88E+00 | 6.13E+00 | −1.03E+02 | −1.09E+03 | −1.90E+02 | 1.27E+02 |
| 20th order coefficient | 1.04E−01 | −4.50E+00 | −4.81E+00 | 1.21E+02 | 1.27E+03 | 1.98E+02 | −9.45E+01 |
| 22nd order coefficient | 8.18E−02 | 2.09E+00 | 2.71E+00 | −1.03E+02 | −1.05E+03 | −1.45E+02 | 4.95E+01 |
| 24th order coefficient | −7.33E−02 | −6.68E−01 | −1.07E+00 | 6.07E+01 | 6.05E+02 | 7.29E+01 | −1.78E+01 |
| 26th order coefficient | 2.68E−02 | 1.41E−01 | 2.80E−01 | −2.35E+01 | −2.30E+02 | −2.38E+01 | 4.14E+00 |

TABLE 2-continued

| | | | | | | | |
|---|---|---|---|---|---|---|---|
| 28th order coefficient | −4.96E−03 | −1.75E−02 | −4.33E−02 | 5.37E+00 | 5.19E+01 | 4.57E+00 | −5.64E−01 |
| 30th order coefficient | 3.81E−04 | 9.78E−04 | 2.99E−03 | −5.46E−01 | −5.26E+00 | −3.89E−01 | 3.40E−02 |

| Surface No. | S8 | S9 | S10 | S11 | S12 | S13 | S14 |
|---|---|---|---|---|---|---|---|
| K | 0.00E+00 | 1.67E+01 | 0.00E+00 | 6.59E+00 | −1.37E+01 | 1.72E+01 | −8.53E+00 |
| 4th order coefficient | −1.03E−01 | −1.50E−01 | −1.81E−01 | 7.36E−03 | 4.38E−02 | −1.56E−01 | −1.02E−01 |
| 6th order coefficient | 3.76E−01 | 5.31E−03 | 8.99E−02 | −5.25E−02 | −3.62E−02 | 9.81E−02 | 6.79E−02 |
| 8th order coefficient | −2.49E+00 | 2.58E−01 | −4.10E−02 | 6.14E−02 | 5.19E−02 | −4.54E−02 | −3.76E−02 |
| 10th order coefficient | 1.13E+01 | −3.31E−01 | 3.12E−02 | −6.09E−02 | −5.53E−02 | 1.49E−02 | 1.56E−02 |
| 12th order coefficient | −3.50E+01 | −6.91E−01 | −4.14E−02 | 4.05E−02 | 3.48E−02 | −3.33E−03 | −4.80E−03 |
| 14th order coefficient | 7.57E+01 | 3.35E+00 | 4.02E−02 | −1.82E−02 | −1.41E−02 | 5.10E−04 | 1.09E−03 |
| 16th order coefficient | −1.17E+02 | −6.39E+00 | −2.48E−02 | 5.42E−03 | 3.91E−03 | −5.42E−05 | −1.80E−04 |
| 18th order coefficient | 1.30E+02 | 7.43E+00 | 1.02E−02 | −1.04E−03 | −7.52E−04 | 3.95E−06 | 2.19E−05 |
| 20th order coefficient | −1.04E+02 | −5.78E+00 | −2.88E−03 | 1.23E−04 | 1.01E−04 | −1.91E−07 | −1.93E−06 |
| 22nd order coefficient | 5.98E+01 | 3.07E+00 | 5.69E−04 | −8.10E−06 | −9.50E−06 | 5.50E−09 | 1.22E−07 |
| 24th order coefficient | −2.40E+01 | −1.10E+00 | −7.70E−05 | 2.28E−07 | 6.05E−07 | −5.51E−11 | −5.32E−09 |
| 26th order coefficient | 6.34E+00 | 2.55E−01 | 6.80E−06 | 0.00E+00 | −2.50E−08 | −1.75E−12 | 1.54E−10 |
| 28th order coefficient | −9.95E−01 | −3.45E−02 | −3.53E−07 | 0.00E+00 | 6.02E−10 | 6.29E−14 | −2.62E−12 |
| 30th order coefficient | 7.00E−02 | 2.07E−03 | 8.16E−09 | 0.00E+00 | −6.42E−12 | −6.05E−16 | 2.00E−14 |

Figure 3:
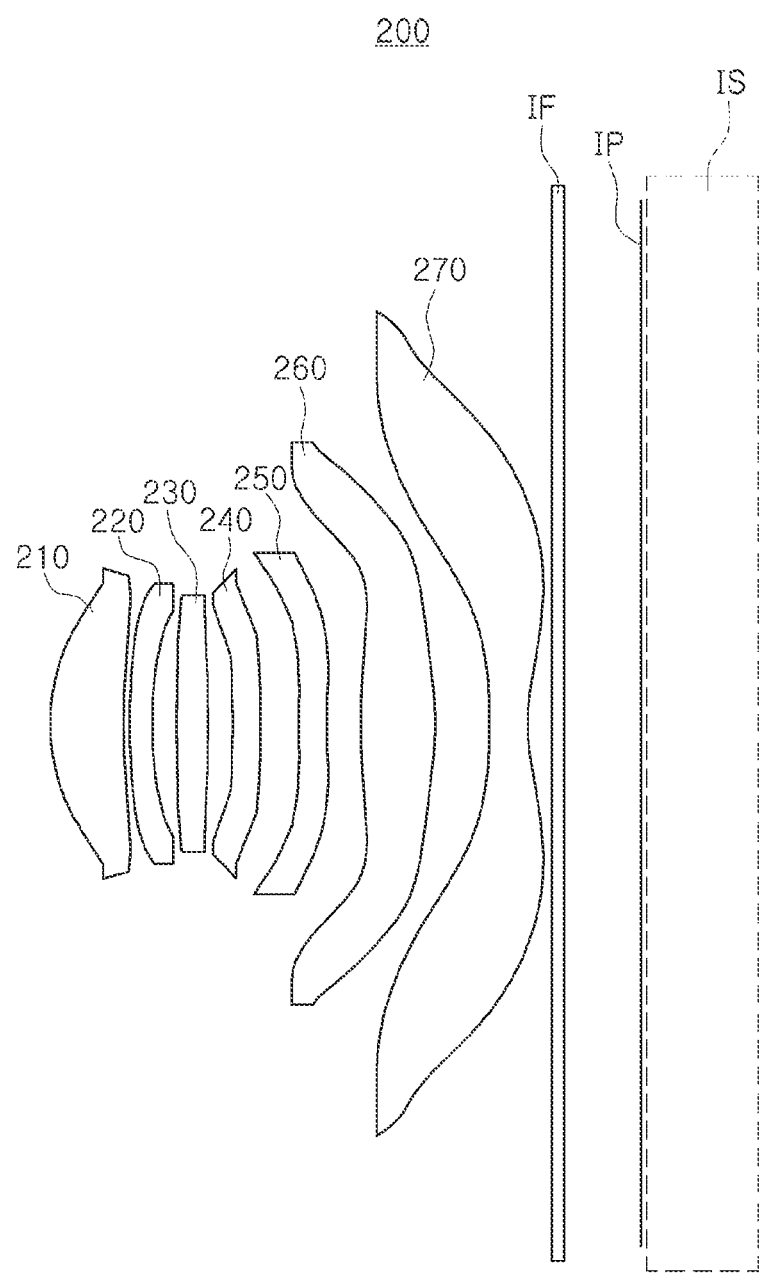
FIG. 3 is a block diagram of an imaging lens system according to a second example.

An imaging lens system according to a second example will be described with reference to FIG. 3.

An imaging lens system 200 includes a first lens 210, a second lens 220, a third lens 230, a fourth lens 240, a fifth lens 250, a sixth lens 260, and a seventh lens 270.

The first lens 210 has positive refractive power, and has a convex object-side surface and a concave image-side surface. The second lens 220 has negative refractive power, and has a convex object-side surface and a concave image-side surface. The third lens 230 has positive refractive power, and has a convex object-side surface and a convex image-side surface. The fourth lens 240 has negative refractive power, and has a concave object-side surface and a concave image-side surface. The fifth lens 250 has negative refractive power, and has a convex object-side surface and a concave image-side surface. In addition, an inflection point is formed on the object-side surface and the image-side surface of the fifth lens 250. The sixth lens 260 has positive refractive power, and has a convex object-side surface and a convex image-side surface. In addition, an inflection point is formed on the object-side surface and the image-side surface of the sixth lens 260. The seventh lens 270 has negative refractive power, and has a concave object-side surface and a concave image-side surface. In addition, an inflection point is formed on the object-side surface and the image-side surface of the seventh lens 270.

The imaging lens system 200 may further include a filter IF, and an imaging plane IP. The filter IF may be disposed between the seventh lens 270 and the imaging plane IP. The imaging plane IP may be formed in a position in which light incident from the first lens 210 to the seventh lens 270 is formed. For example, the imaging plane IP may be formed on one surface of the image sensor IS of the camera module or inside the image sensor IS.

Figure 4:
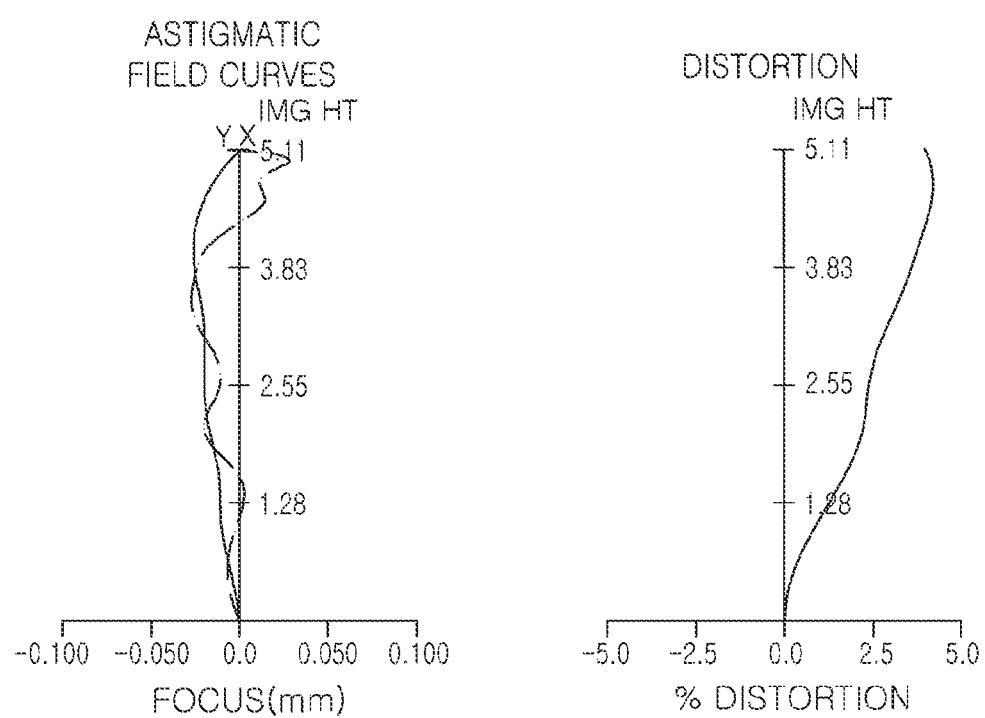
FIG. 4 is an aberration curve of the imaging lens system illustrated in FIG. 3.

The imaging lens system 200 configured as above may exhibit aberration characteristics as illustrated in FIG. 4. Tables 3 and 4 illustrate lens characteristics and aspheric values of the imaging lens system 200.

TABLE 3

| Surface No. | Reference | Radius of curvature | Thickness/distance | Refractive index | Abbe number |
|---|---|---|---|---|---|
| S1 | First lens | 1.9090 | 0.718 | 1.546 | 56.0 |
| S2 | | 6.5707 | 0.061 | | |
| S3 | Second lens | 6.0017 | 0.220 | 1.689 | 18.2 |
| S4 | | 3.8216 | 0.239 | | |
| S5 | Third lens | 20.2062 | 0.307 | 1.537 | 55.7 |
| S6 | | −25.9245 | 0.249 | | |
| S7 | Fourth lens | −35.0542 | 0.271 | 1.679 | 19.2 |
| S8 | | 87.4355 | 0.378 | | |
| S9 | Fifth lens | 15.0000 | 0.274 | 1.641 | 24.0 |
| S10 | | 5.9264 | 0.334 | | |
| S11 | Sixth lens | 7.1068 | 0.729 | 1.570 | 37.4 |

TABLE 3-continued

| Surface No. | Reference | Radius of curvature | Thickness/distance | Refractive index | Abbe number |
|---|---|---|---|---|---|
| S12 | | −3.0279 | 0.531 | | |
| S13 | Seventh lens | −18.5005 | 0.380 | 1.537 | 55.7 |
| S14 | | 1.8460 | 0.237 | | |
| S15 | Filter | Infinity | 0.110 | 1.519 | 64.2 |
| S16 | | Infinity | 0.763 | | |
| S17 | Imaging plane | Infinity | 0.000 | | |

TABLE 4

| Surface No. | S1 | S2 | S3 | S4 | S5 | S6 | S7 |
|---|---|---|---|---|---|---|---|
| K | −1.99E+00 | −4.64E+01 | 1.54E+01 | 7.00E+00 | −1.00E+00 | −1.00E+00 | −1.00E+00 |
| 4th order coefficient | 3.29E−02 | −1.41E−02 | −4.00E−02 | −1.82E−02 | 1.21E−02 | −3.27E−02 | −1.21E−01 |
| 6th order coefficient | −5.61E−03 | 5.21E−02 | 3.19E−02 | −4.39E−03 | −3.71E−01 | 9.19E−02 | 4.93E−01 |
| 8th order coefficient | 4.38E−02 | −3.45E−01 | −3.85E−02 | 9.74E−02 | 3.71E+00 | −3.71E−01 | −3.25E+00 |
| 10th order coefficient | −1.06E−01 | 1.47E+00 | 2.68E−01 | 6.20E−02 | −2.41E+01 | 5.32E−01 | 1.40E+01 |
| 12th order coefficient | −2.49E−02 | −3.93E+00 | −9.47E−01 | −2.30E+00 | 1.07E+02 | 2.13E+00 | −4.11E+01 |
| 14th order coefficient | 6.80E−01 | 7.06E+00 | 1.95E+00 | 1.05E+01 | −3.31E+02 | −1.37E+01 | 8.42E+01 |
| 16th order coefficient | −1.75E+00 | −8.84E+00 | −2.63E+00 | −2.63E+01 | 7.36E+02 | 3.73E+01 | −1.22E+02 |
| 18th order coefficient | 2.47E+00 | 7.91E+00 | 2.48E+00 | 4.23E+01 | −1.18E+03 | −6.31E+01 | 1.27E+02 |
| 20th order coefficient | −2.25E+00 | −5.08E+00 | −1.67E+00 | −4.59E+01 | 1.37E+03 | 7.22E+01 | −9.45E+01 |
| 22nd order coefficient | 1.37E+00 | 2.32E+00 | 8.16E−01 | 3.38E+01 | −1.13E+03 | −5.70E+01 | 4.95E+01 |
| 24th order coefficient | −5.58E−01 | −7.37E−01 | −2.82E−01 | −1.66E+01 | 6.52E+02 | 3.09E+01 | −1.78E+01 |
| 26th order coefficient | 1.46E−01 | 1.54E−01 | 6.57E−02 | 5.21E+00 | −2.48E+02 | −1.10E+01 | 4.14E+00 |
| 28th order coefficient | −2.23E−02 | −1.91E−02 | −9.14E−03 | −9.31E−01 | 5.58E+01 | 2.35E+00 | −5.64E−01 |
| 30th order coefficient | 1.50E−03 | 1.06E−03 | 5.66E−04 | 7.17E−02 | −5.64E+00 | −2.29E−01 | 3.40E−02 |

| Surface No. | S8 | S9 | S10 | S11 | S12 | S13 | S14 |
|---|---|---|---|---|---|---|---|
| K | 0.00E+00 | 1.19E+01 | 0.00E+00 | 6.60E+00 | −1.37E+01 | 1.63E+01 | −8.83E+00 |
| 4th order coefficient | −1.01E−01 | −1.55E−01 | −1.85E−01 | 7.14E−03 | 4.20E−02 | −1.57E−01 | −9.84E−02 |
| 6th order coefficient | 3.43E−01 | 4.35E−02 | 1.05E−01 | −5.15E−02 | −3.28E−02 | 1.03E−01 | 6.41E−02 |
| 8th order coefficient | −2.15E+00 | 8.48E−02 | −8.72E−02 | 5.95E−02 | 4.87E−02 | −5.12E−02 | −3.50E−02 |
| 10th order coefficient | 9.38E+00 | 1.34E−01 | 1.09E−01 | −5.97E−02 | −5.40E−02 | 1.81E−02 | 1.43E−02 |
| 12th order coefficient | −2.84E+01 | −1.52E+00 | −1.24E−01 | 4.03E−02 | 3.47E−02 | −4.33E−03 | −4.40E−03 |
| 14th order coefficient | 6.06E+01 | 4.37E+00 | 9.87E−02 | −1.83E−02 | −1.43E−02 | 7.20E−04 | 1.00E−03 |
| 16th order coefficient | −9.28E+01 | −7.30E+00 | −5.37E−02 | 5.51E−03 | 4.02E−03 | −8.48E−05 | −1.69E−04 |
| 18th order coefficient | 1.03E+02 | 8.04E+00 | 2.03E−02 | −1.06E−03 | −7.84E−04 | 7.15E−06 | 2.07E−05 |
| 20th order coefficient | −8.28E+01 | −6.08E+00 | −5.43E−03 | 1.26E−04 | 1.07E−04 | −4.32E−07 | −1.85E−06 |
| 22nd order coefficient | 4.77E+01 | 3.17E+00 | 1.03E−03 | −8.34E−06 | −1.01E−05 | 1.85E−08 | 1.18E−07 |
| 24th order coefficient | −1.92E+01 | −1.13E+00 | −1.34E−04 | 2.35E−07 | 6.53E−07 | −5.44E−10 | −5.21E−09 |
| 26th order coefficient | 5.10E+00 | 2.60E−01 | 1.14E−05 | 0.00E+00 | −2.72E−08 | 1.05E−11 | 1.52E−10 |
| 28th order coefficient | −8.04E−01 | −3.51E−02 | −5.77E−07 | 0.00E+00 | 6.63E−10 | −1.20E−13 | −2.61E−12 |
| 30th order coefficient | 5.69E−02 | 2.10E−03 | 1.30E−08 | 0.00E+00 | −7.16E−12 | 6.31E−16 | 2.01E−14 |

Figure 5:
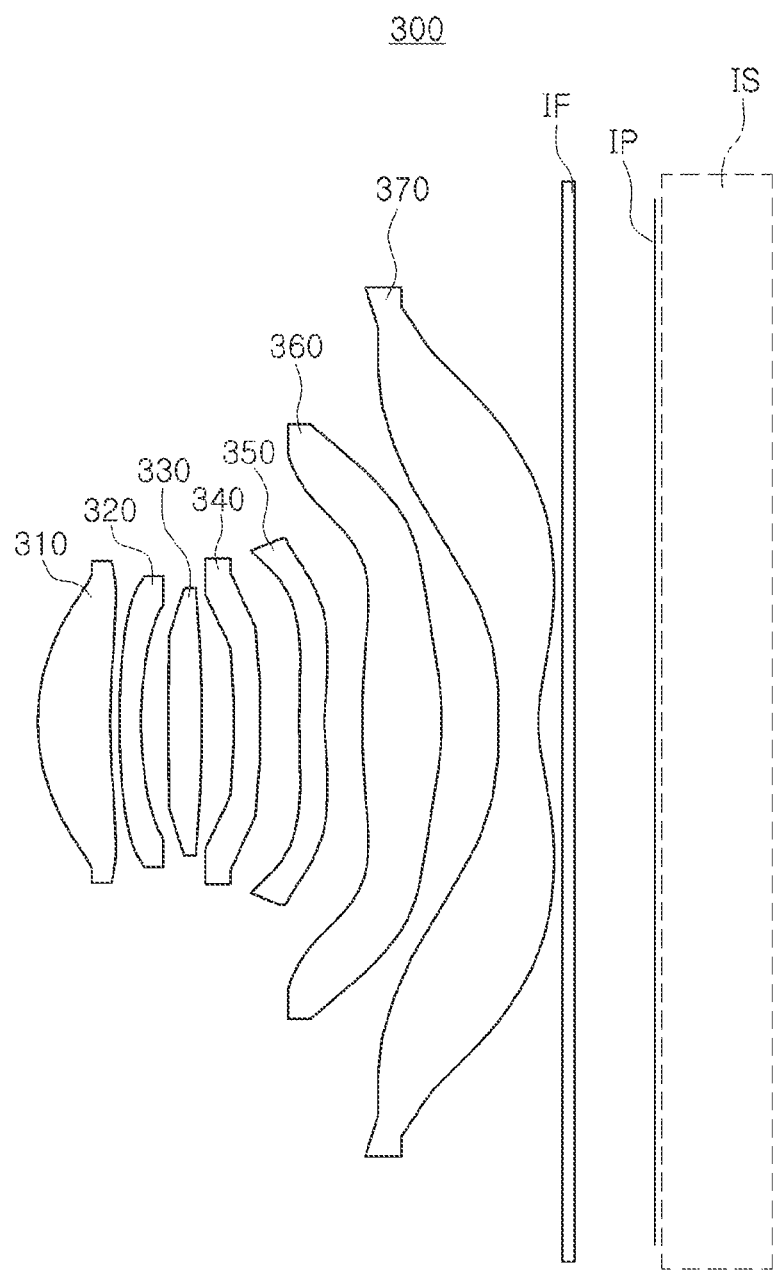
FIG. 5 is a block diagram of an imaging lens system according to a third example.

An imaging lens system according to a third example will be described with reference to FIG. 5.

An imaging lens system 300 includes a first lens 310, a second lens 320, a third lens 330, a fourth lens 340, a fifth lens 350, a sixth lens 360, and a seventh lens 370.

The first lens 310 has positive refractive power, and has a convex object-side surface and a concave image-side surface. The second lens 320 has negative refractive power, and has a convex object-side surface and a concave image-side surface. The third lens 330 has positive refractive power, and has a convex object-side surface and a convex image-side surface. The fourth lens 340 has negative refractive power, and has a concave object-side surface and a concave image-side surface. The fifth lens 350 has negative refractive power, and has a convex object-side surface and a concave image-side surface. In addition, an inflection point is formed on the object-side surface and the image-side surface of the fifth lens 350. The sixth lens 360 has positive refractive power, and has a convex object-side surface and a convex image-side surface. In addition, an inflection point is formed on the object-side surface and the image-side surface of the sixth lens 360. The seventh lens 370 has negative refractive power, and has a concave object-side surface and a concave image-side surface. In addition, an inflection point is formed on the object-side surface and the image-side surface of the seventh lens 370.

The imaging lens system 300 may further include a filter IF, and an imaging plane IP. The filter IF may be disposed between the seventh lens 370 and the imaging plane IP. The imaging plane IP may be formed in a position in which light incident from the first lens 310 to the seventh lens 370 is formed. For example, the imaging plane IP may be formed on one surface of the image sensor IS of the camera module or inside the image sensor IS.

Figure 6:
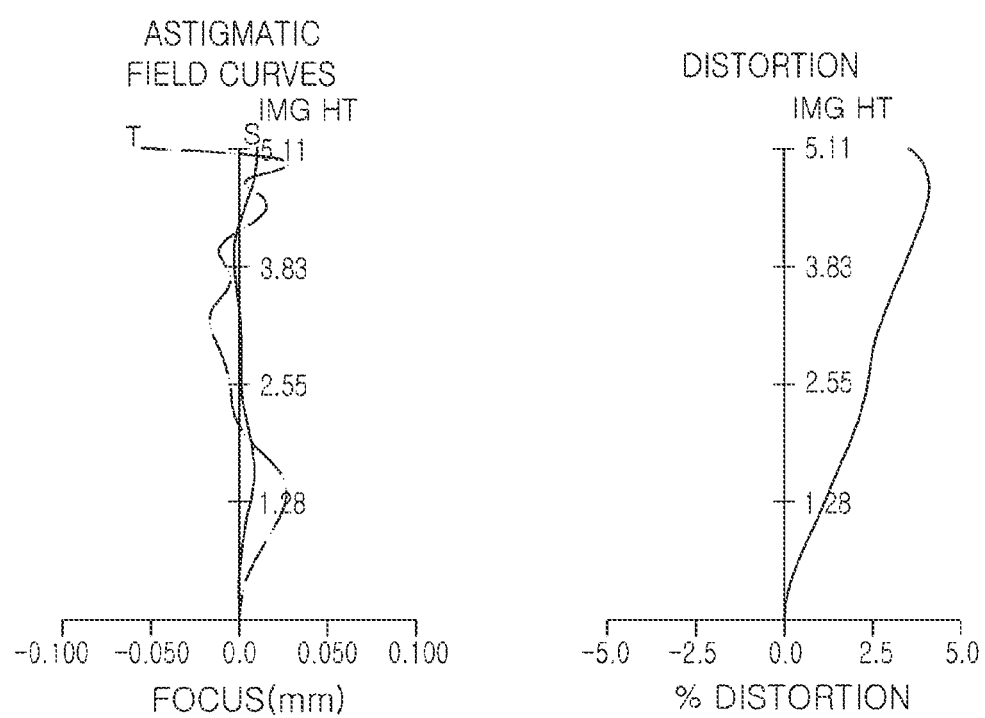
FIG. 6 is an aberration curve of the imaging lens system illustrated in FIG. 5.

The imaging lens system 300 configured as above may exhibit aberration characteristics as illustrated in FIG. 6. Tables 5 and 6 illustrate lens characteristics and aspheric values of the imaging lens system 300.

TABLE 5

| Surface No. | Reference | Radius of curvature | Thickness/distance | Refractive index | Abbe number |
|---|---|---|---|---|---|
| S1 | First lens | 1.9099 | 0.682 | 1.546 | 56.0 |
| S2 | | 6.9800 | 0.089 | | |
| S3 | Second lens | 6.1887 | 0.200 | 1.679 | 19.2 |
| S4 | | 3.7150 | 0.257 | | |
| S5 | Third lens | 20.2062 | 0.319 | 1.537 | 55.7 |
| S6 | | −21.9351 | 0.299 | | |
| S7 | Fourth lens | −24.8862 | 0.246 | 1.679 | 19.2 |
| S8 | | 38.0041 | 0.372 | | |
| S9 | Fifth lens | 5.0941 | 0.240 | 1.641 | 24.0 |
| S10 | | 3.6229 | 0.354 | | |
| S11 | Sixth lens | 7.1297 | 0.747 | 1.570 | 37.4 |
| S12 | | −2.9000 | 0.534 | | |
| S13 | Seventh lens | −16.8606 | 0.380 | 1.537 | 55.7 |
| S14 | | 1.7878 | 0.225 | | |
| S15 | Filter | Infinity | 0.110 | 1.519 | 64.2 |
| S16 | | Infinity | 0.745 | | |
| S17 | Imaging plane | Infinity | 0.000 | | |

TABLE 6

| Surface No. | S1 | S2 | S3 | S4 | S5 | S6 | S7 |
|---|---|---|---|---|---|---|---|
| K | −2.09E+00 | −5.26E+01 | 1.60E+01 | 6.77E+00 | −1.00E+00 | −1.00E+00 | −1.00E+00 |
| 4th order coefficient | 2.53E−02 | −2.23E−02 | −4.46E−02 | −4.44E−02 | −9.60E−03 | −8.12E−03 | −8.60E−02 |
| 6th order coefficient | 8.40E−02 | 1.30E−01 | −2.93E−02 | 1.68E−01 | −1.35E−02 | −2.74E−01 | −1.30E−01 |
| 8th order coefficient | −4.42E−01 | −7.06E−01 | 7.89E−01 | −5.40E−01 | −1.67E−01 | 2.76E+00 | 1.72E+00 |
| 10th order coefficient | 1.50E+00 | 2.53E+00 | −4.72E+00 | −7.18E−01 | 2.01E+00 | −1.71E+01 | −1.09E+01 |
| 12th order coefficient | −3.49E+00 | −6.09E+00 | 1.73E+01 | 1.64E+01 | −1.06E+01 | 7.08E+01 | 4.21E+01 |
| 14th order coefficient | 5.76E+00 | 1.02E+01 | −4.22E+01 | −7.86E+01 | 3.56E+01 | −2.06E+02 | −1.09E+02 |
| 16th order coefficient | −6.94E+00 | −1.22E+01 | 7.14E+01 | 2.13E+02 | −8.30E+01 | 4.33E+02 | 1.99E+02 |
| 18th order coefficient | 6.18E+00 | 1.05E+01 | −8.50E+01 | −3.76E+02 | 1.40E+02 | −6.65E+02 | −2.56E+02 |
| 20th order coefficient | −4.07E+00 | −6.57E+00 | 7.17E+01 | 4.53E+02 | −1.70E+02 | 7.45E+02 | 2.36E+02 |
| 22nd order coefficient | 1.95E+00 | 2.94E+00 | −4.25E+01 | −3.76E+02 | 1.48E+02 | −6.02E+02 | −1.53E+02 |
| 24th order coefficient | −6.66E−01 | −9.23E−01 | 1.73E+01 | 2.12E+02 | −9.00E+01 | 3.41E+02 | 6.87E+01 |
| 26th order coefficient | 1.52E−01 | 1.92E−01 | −4.61E+00 | −7.77E+01 | 3.62E+01 | −1.28E+02 | −2.01E+01 |

TABLE 6-continued

| | | | | | | | |
|---|---|---|---|---|---|---|---|
| 28th order coefficient | −2.08E−02 | −2.39E−02 | 7.21E−01 | 1.67E+01 | −8.62E+00 | 2.88E+01 | 3.45E+00 |
| 30th order coefficient | 1.29E−03 | 1.34E−03 | −5.03E−02 | −1.59E+00 | 9.21E−01 | −2.91E+00 | −2.64E−01 |

| Surface No. | S8 | S9 | S10 | S11 | S12 | S13 | S14 |
|---|---|---|---|---|---|---|---|
| K | 0.00E+00 | −3.52E+01 | 0.00E+00 | 6.36E+00 | −1.45E+01 | 1.47E+01 | −8.68E+00 |
| 4th order coefficient | −1.12E−01 | −1.77E−01 | −2.29E−01 | −2.73E−03 | 1.08E−02 | −1.95E−01 | −1.16E−01 |
| 6th order coefficient | 2.22E−01 | 9.42E−02 | 1.15E−01 | −4.52E−02 | −1.52E−02 | 1.25E−01 | 7.73E−02 |
| 8th order coefficient | −1.18E+00 | 3.25E−02 | −3.69E−03 | 6.47E−02 | 3.88E−02 | −5.34E−02 | −3.98E−02 |
| 10th order coefficient | 5.31E+00 | −6.85E−02 | −1.02E−01 | −6.50E−02 | −3.72E−02 | 1.66E−02 | 1.53E−02 |
| 12th order coefficient | −1.73E+01 | −3.24E−01 | 1.27E−01 | 4.14E−02 | 1.92E−02 | −3.78E−03 | −4.36E−03 |
| 14th order coefficient | 3.93E+01 | 1.22E+00 | −7.42E−02 | −1.76E−02 | −6.38E−03 | 6.34E−04 | 9.22E−04 |
| 16th order coefficient | −6.35E+01 | −2.11E+00 | 1.60E−02 | 4.97E−03 | 1.46E−03 | −7.89E−05 | −1.44E−04 |
| 18th order coefficient | 7.34E+01 | 2.31E+00 | 6.64E−03 | −9.05E−04 | −2.36E−04 | 7.34E−06 | 1.64E−05 |
| 20th order coefficient | −6.08E+01 | −1.73E+00 | −6.14E−03 | 1.02E−04 | 2.70E−05 | −5.10E−07 | −1.38E−06 |
| 22nd order coefficient | 3.58E+01 | 8.96E−01 | 2.15E−03 | −6.39E−06 | −2.18E−06 | 2.61E−08 | 8.34E−08 |
| 24th order coefficient | −1.46E+01 | −3.18E−01 | −4.30E−04 | 1.72E−07 | 1.20E−07 | −9.65E−10 | −3.55E−09 |
| 26th order coefficient | 3.91E+00 | 7.36E−02 | 5.10E−05 | 0.00E+00 | −4.30E−09 | 2.44E−11 | 1.00E−10 |
| 28th order coefficient | −6.19E−01 | −1.00E−02 | −3.37E−06 | 0.00E+00 | 9.01E−11 | −3.78E−13 | −1.69E−12 |
| 30th order coefficient | 4.37E−02 | 6.03E−04 | 9.54E−08 | 0.00E+00 | −8.36E−13 | 2.72E−15 | 1.29E−14 |

Figure 7:
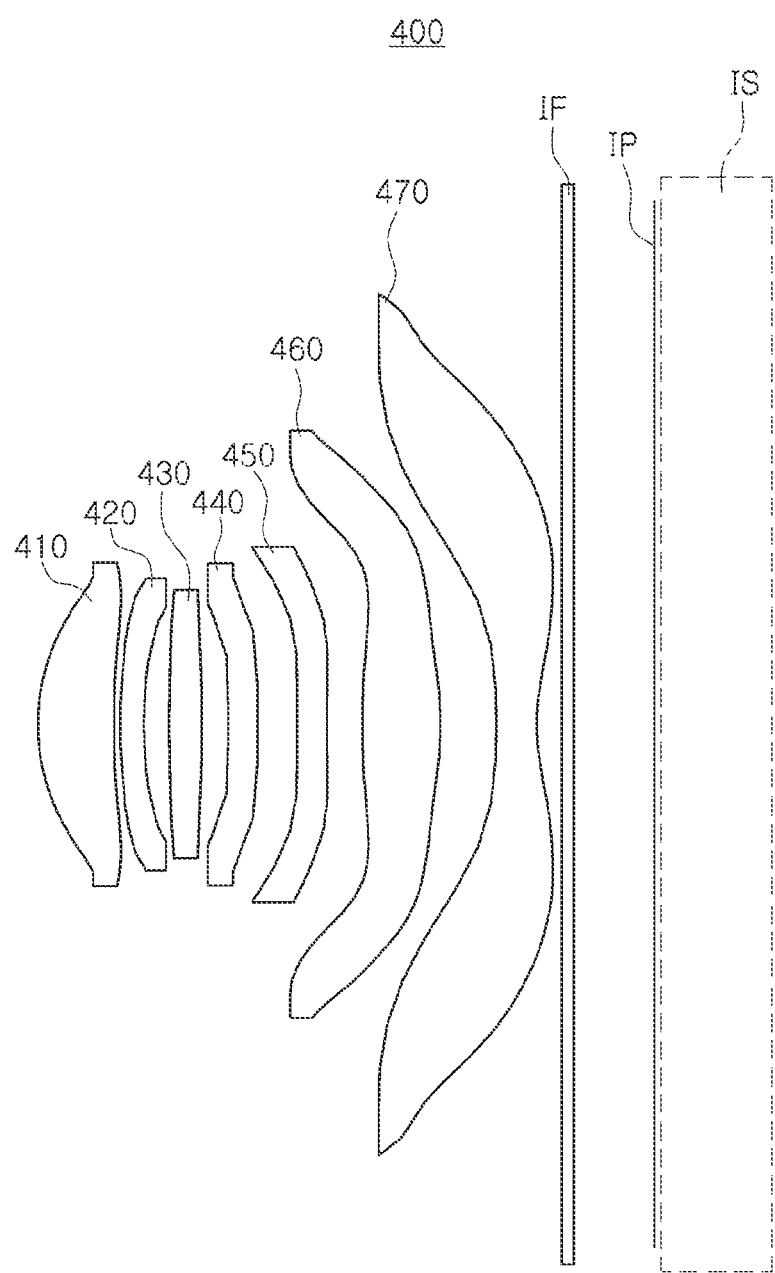
FIG. 7 is a block diagram of an imaging lens system according to a fourth example.

An imaging lens system according to a fourth example will be described with reference to FIG. 7.

An imaging lens system 400 includes a first lens 410, a second lens 420, a third lens 430, a fourth lens 440, a fifth lens 450, a sixth lens 460, and a seventh lens 470.

The first lens 410 has positive refractive power, and has a convex object-side surface and a concave image-side surface. The second lens 420 has negative refractive power, and has a convex object-side surface and a concave image-side surface. The third lens 430 has positive refractive power, and has a convex object-side surface and a convex image-side surface. The fourth lens 440 has negative refractive power, and has a concave object-side surface and a concave image-side surface. The fifth lens 450 has negative refractive power, and has a convex object-side surface and a concave image-side surface. In addition, an inflection point is formed on the object-side surface and the image-side surface of the fifth lens 450. The sixth lens 460 has positive refractive power, and has a convex object-side surface and a convex image-side surface. In addition, an inflection point is formed on the object-side surface and the image-side surface of the sixth lens 460. The seventh lens 470 has negative refractive power, and has a concave object-side surface and a concave image-side surface. In addition, an inflection point is formed on the object-side surface and the image-side surface of the seventh lens 470.

The imaging lens system 400 may further include a filter IF, and an imaging plane IP. The filter IF may be disposed between the seventh lens 470 and the imaging plane IP. The imaging plane IP may be formed in a position in which light incident from the first lens 410 to the seventh lens 470 is formed. For example, the imaging plane IP may be formed on one surface of the image sensor IS of the camera module or inside the image sensor IS.

Figure 8:
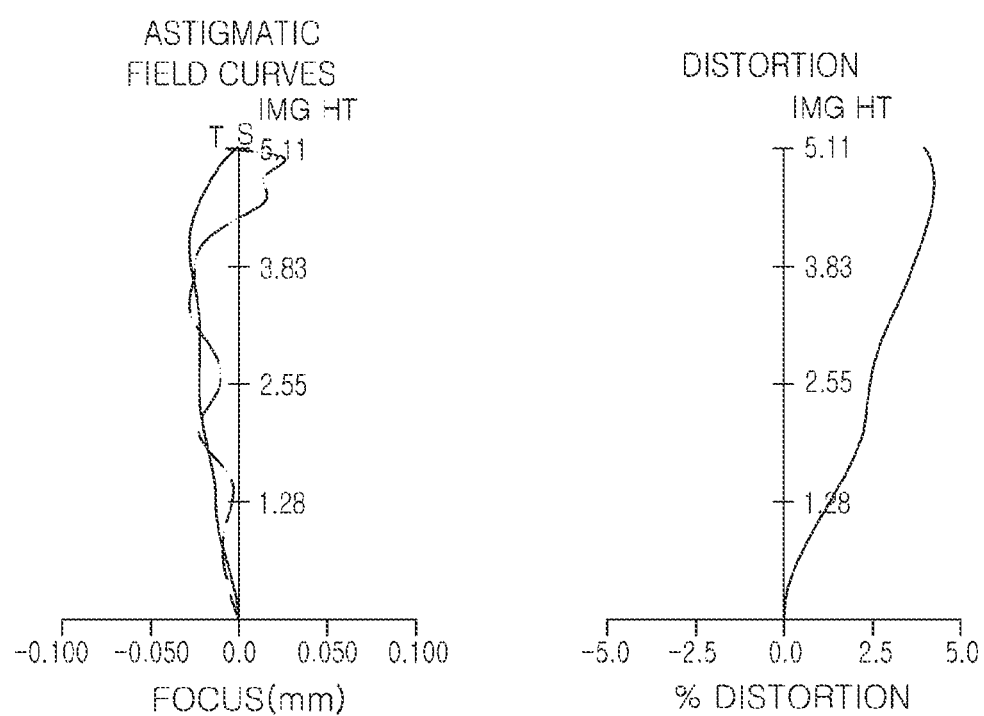
FIG. 8 is an aberration curve of the imaging lens system illustrated in FIG. 7.

The imaging lens system 400 configured as above may exhibit aberration characteristics as illustrated in FIG. 8. Tables 7 and 8 illustrate lens characteristics and aspheric values of the imaging lens system 400.

TABLE 7

| Surface No. | Reference | Radius of curvature | Thickness/distance | Refractive index | Abbe number |
|---|---|---|---|---|---|
| S1 | First lens | 1.9086 | 0.716 | 1.546 | 56.0 |
| S2 | | 6.5538 | 0.060 | | |
| S3 | Second lens | 6.0211 | 0.220 | 1.689 | 18.2 |
| S4 | | 3.8292 | 0.238 | | |
| S5 | Third lens | 20.2062 | 0.308 | 1.537 | 55.7 |
| S6 | | −25.3303 | 0.251 | | |
| S7 | Fourth lens | −35.0542 | 0.272 | 1.679 | 19.2 |
| S8 | | 84.1481 | 0.375 | | |
| S9 | Fifth lens | 15.0000 | 0.275 | 1.641 | 24.0 |
| S10 | | 5.9721 | 0.336 | | |
| S11 | Sixth lens | 7.1084 | 0.730 | 1.570 | 37.4 |

TABLE 7-continued

| Surface No. | Reference | Radius of curvature | Thickness/distance | Refractive index | Abbe number |
|---|---|---|---|---|---|
| S12 | | −3.0370 | 0.530 | | |
| S13 | Seventh lens | −18.7640 | 0.380 | 1.537 | 55.7 |
| S14 | | 1.8394 | 0.237 | | |
| S15 | Filter | Infinity | 0.110 | 1.519 | 64.2 |
| S16 | | Infinity | 0.763 | | |
| S17 | Imaging plane | Infinity | 0.000 | | |

TABLE 8

| Surface No. | S1 | S2 | S3 | S4 | S5 | S6 | S7 |
|---|---|---|---|---|---|---|---|
| K | −2.00E+00 | −4.66E+01 | 1.54E+01 | 7.00E+00 | −1.00E+00 | −1.00E+00 | −1.00E+00 |
| 4th order coefficient | 3.64E−02 | −1.13E−02 | −3.94E−02 | −1.70E−02 | 1.39E−02 | −3.37E−02 | −1.21E−01 |
| 6th order coefficient | −4.18E−02 | 3.28E−02 | 2.62E−02 | −2.95E−02 | −3.88E−01 | 9.29E−02 | 4.93E−01 |
| 8th order coefficient | 2.72E−01 | −2.51E−01 | −5.69E−03 | 3.69E−01 | 3.86E+00 | −2.29E−01 | −3.25E+00 |
| 10th order coefficient | −1.01E+00 | 1.17E+00 | 1.31E−01 | −1.80E+00 | −2.51E+01 | −9.72E−01 | 1.40E+01 |
| 12th order coefficient | 2.40E+00 | −3.28E+00 | −5.61E−01 | 6.11E+00 | 1.12E+02 | 1.03E+01 | −4.11E+01 |
| 14th order coefficient | −3.86E+00 | 6.06E+00 | 1.19E+00 | −1.57E+01 | −3.51E+02 | −4.18E+01 | 8.42E+01 |
| 16th order coefficient | 4.31E+00 | −7.76E+00 | −1.58E+00 | 3.11E+01 | 7.85E+02 | 1.03E+02 | −1.22E+02 |
| 18th order coefficient | −3.38E+00 | 7.06E+00 | 1.44E+00 | −4.77E+01 | −1.27E+03 | −1.71E+02 | 1.27E+02 |
| 20th order coefficient | 1.85E+00 | −4.60E+00 | −9.36E−01 | 5.54E+01 | 1.48E+03 | 1.98E+02 | −9.45E+01 |
| 22nd order coefficient | −6.81E−01 | 2.13E+00 | 4.46E−01 | −4.73E+01 | −1.23E+03 | −1.59E+02 | 4.95E+01 |
| 24th order coefficient | 1.58E−01 | −6.83E−01 | −1.54E−01 | 2.84E+01 | 7.09E+02 | 8.80E+01 | −1.78E+01 |
| 26th order coefficient | −1.94E−02 | 1.45E−01 | 3.66E−02 | −1.12E+01 | −2.70E+02 | −3.19E+01 | 4.14E+00 |
| 28th order coefficient | 4.73E−04 | −1.81E−02 | −5.24E−03 | 2.63E+00 | 6.10E+01 | 6.80E+00 | −5.64E−01 |
| 30th order coefficient | 9.68E−05 | 1.02E−03 | 3.30E−04 | −2.73E−01 | −6.17E+00 | −6.48E−01 | 3.40E−02 |

| Surface No. | S8 | S9 | S10 | S11 | S12 | S13 | S14 |
|---|---|---|---|---|---|---|---|
| K | 0.00E+00 | 1.58E+01 | 0.00E+00 | 6.60E+00 | −1.37E+01 | 1.66E+01 | −8.71E+00 |
| 4th order coefficient | −9.76E−02 | −1.52E−01 | −1.83E−01 | 7.28E−03 | 4.29E−02 | −1.57E−01 | −9.80E−02 |
| 6th order coefficient | 3.13E−01 | 3.22E−02 | 9.49E−02 | −5.25E−02 | −3.36E−02 | 1.02E−01 | 6.25E−02 |
| 8th order coefficient | −2.03E+00 | 1.03E−01 | −6.00E−02 | 6.12E−02 | 4.92E−02 | −4.99E−02 | −3.31E−02 |
| 10th order coefficient | 9.13E+00 | 1.63E−01 | 6.92E−02 | −6.07E−02 | −5.35E−02 | 1.72E−02 | 1.32E−02 |
| 12th order coefficient | −2.83E+01 | −1.70E+00 | −8.67E−02 | 4.04E−02 | 3.38E−02 | −4.02E−03 | −3.97E−03 |
| 14th order coefficient | 6.12E+01 | 4.75E+00 | 7.52E−02 | −1.82E−02 | −1.38E−02 | 6.48E−04 | 8.96E−04 |
| 16th order coefficient | −9.47E+01 | −7.76E+00 | −4.31E−02 | 5.45E−03 | 3.81E−03 | −7.34E−05 | −1.50E−04 |
| 18th order coefficient | 1.06E+02 | 8.42E+00 | 1.69E−02 | −1.05E−03 | −7.34E−04 | 5.89E−06 | 1.85E−05 |
| 20th order coefficient | −8.58E+01 | −6.29E+00 | −4.62E−03 | 1.24E−04 | 9.89E−05 | −3.33E−07 | −1.66E−06 |
| 22nd order coefficient | 4.98E+01 | 3.26E+00 | 8.84E−04 | −8.20E−06 | −9.27E−06 | 1.30E−08 | 1.06E−07 |
| 24th order coefficient | −2.01E+01 | −1.15E+00 | −1.16E−04 | 2.31E−07 | 5.91E−07 | −3.32E−10 | −4.72E−09 |
| 26th order coefficient | 5.37E+00 | 2.64E−01 | 9.99E−06 | 0.00E+00 | −2.44E−08 | 5.08E−12 | 1.38E−10 |
| 28th order coefficient | −8.51E−01 | −3.55E−02 | −5.06E−07 | 0.00E+00 | 5.89E−10 | −3.80E−14 | −2.39E−12 |
| 30th order coefficient | 6.04E−02 | 2.12E−03 | 1.14E−08 | 0.00E+00 | −6.29E−12 | 7.14E−17 | 1.84E−14 |

Figure 9:
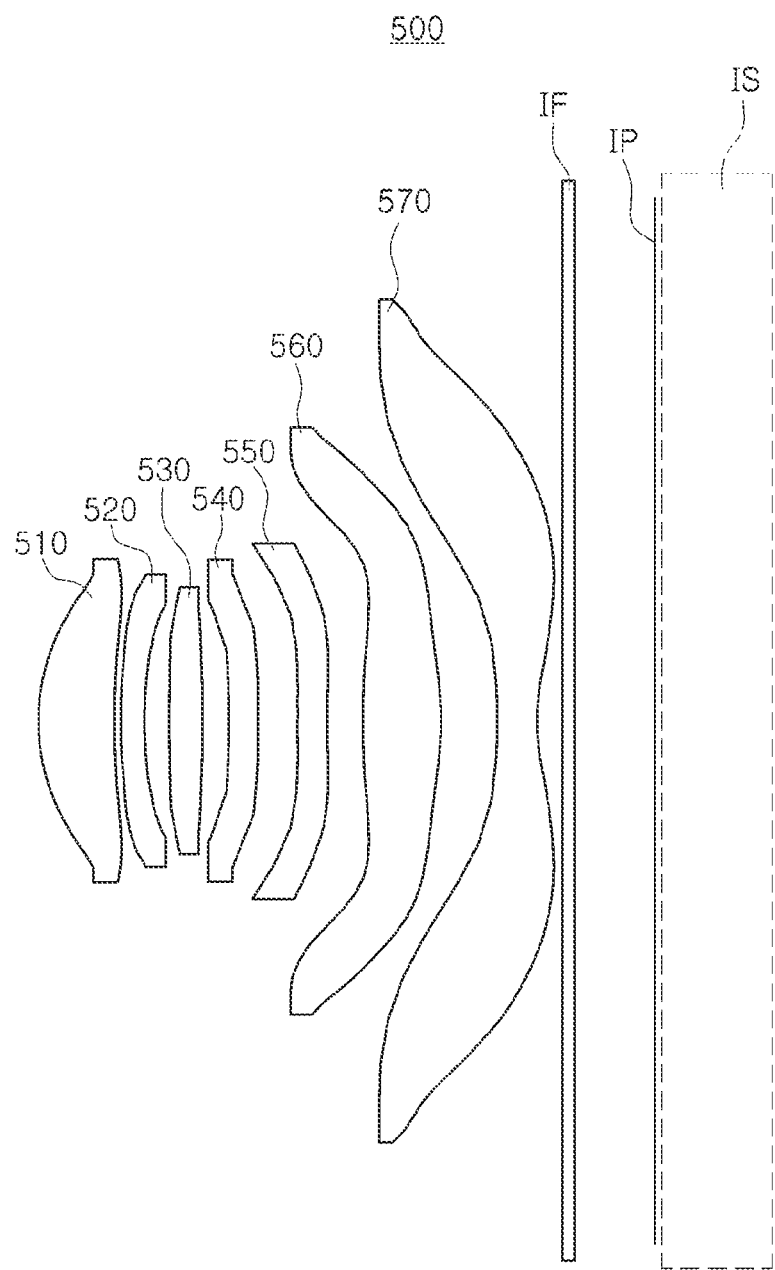
FIG. 9 is a block diagram of an imaging lens system according to a fifth example.

An imaging lens system according to a fifth example will be described with reference to FIG. 9.

An imaging lens system 500 includes a first lens 510, a second lens 520, a third lens 530, a fourth lens 540, a fifth lens 550, a sixth lens 560, and a seventh lens 570.

The first lens 510 has positive refractive power, and has a convex object-side surface and a concave image-side surface. The second lens 520 has negative refractive power, and has a convex object-side surface and a concave image-side surface. The third lens 530 has positive refractive power, and has a convex object-side surface and a convex image-side surface. The fourth lens 540 has negative refractive power, and has a concave object-side surface and a concave image-side surface. The fifth lens 550 has negative refractive power, and has a convex object-side surface and a concave image-side surface. In addition, an inflection point is formed on the object-side surface and the image-side surface of the fifth lens 550. The sixth lens 560 has positive refractive power, and has a convex object-side surface and a convex image-side surface. In addition, an inflection point is formed on the object-side surface and the image-side surface of the sixth lens 560. The seventh lens 570 has negative refractive power, and has a concave object-side surface and a concave image-side surface. In addition, an inflection point is formed on the object-side surface and the image-side surface of the seventh lens 570.

The imaging lens system 500 may further include a filter IF, and an imaging plane IP. The filter IF may be disposed between the seventh lens 570 and the imaging plane IP. The imaging plane IP may be formed in a position in which light incident from the first lens 510 to the seventh lens 570 is formed. For example, the imaging plane IP may be formed on one surface of the image sensor IS of the camera module or inside the image sensor IS.

Figure 10:
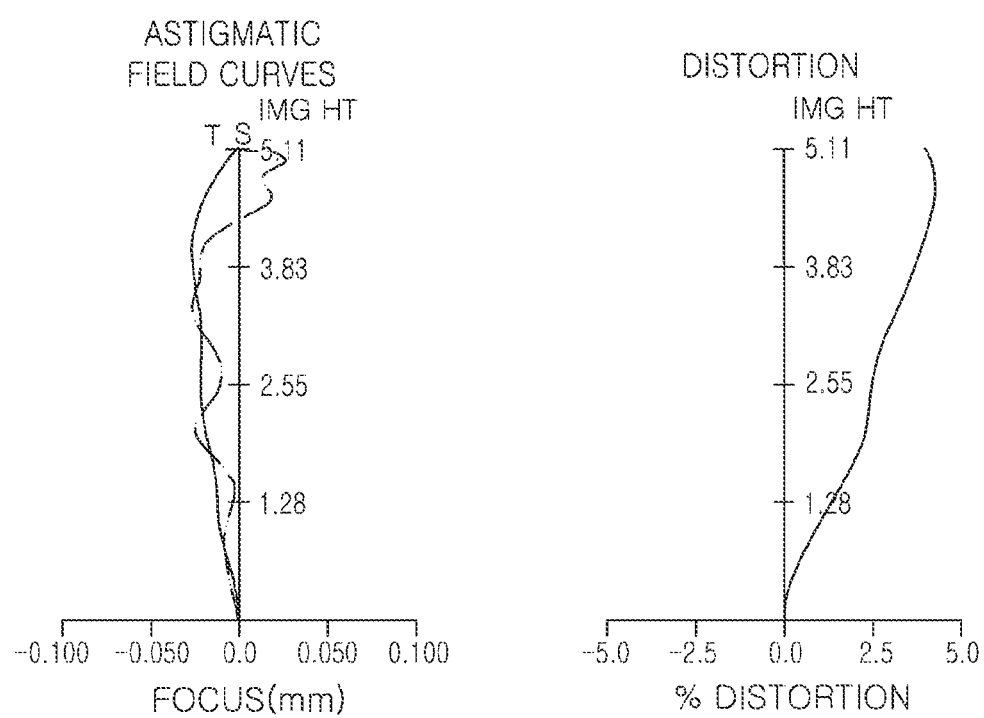
FIG. 10 is an aberration curve of the imaging lens system illustrated in FIG. 9.

The imaging lens system 500 configured as above may exhibit aberration characteristics as illustrated in FIG. 10. Tables 9 and 10 illustrate lens characteristics and aspheric values of the imaging lens system 500.

TABLE 9

| Surface No. | Reference | Radius of curvature | Thickness/distance | Refractive index | Abbe number |
|---|---|---|---|---|---|
| S1 | First lens | 1.9053 | 0.710 | 1.546 | 56.1 |
| S2 | | 6.5067 | 0.061 | | |
| S3 | Second lens | 6.0206 | 0.220 | 1.689 | 18.2 |
| S4 | | 3.8302 | 0.237 | | |
| S5 | Third lens | 19.9000 | 0.308 | 1.642 | 23.9 |
| S6 | | −25.4380 | 0.254 | | |
| S7 | Fourth lens | −35.0542 | 0.273 | 1.680 | 19.2 |
| S8 | | 74.1564 | 0.372 | | |
| S9 | Fifth lens | 15.0000 | 0.280 | 1.571 | 37.4 |
| S10 | | 6.0398 | 0.338 | | |
| S11 | Sixth lens | 7.1129 | 0.726 | 1.547 | 56.1 |
| S12 | | −3.0490 | 0.531 | | |
| S13 | Seventh lens | −19.0428 | 0.380 | 1.547 | 56.1 |
| S14 | | 1.8410 | 0.237 | | |
| S15 | Filter | Infinity | 0.110 | 1.519 | 64.2 |
| S16 | | Infinity | 0.763 | | |
| S17 | Imaging plane | Infinity | 0.000 | | |

TABLE 10

| Surface No. | S1 | S2 | S3 | S4 | S5 | S6 | S7 |
|---|---|---|---|---|---|---|---|
| K | −2.01E+00 | −4.70E+01 | 1.54E+01 | 7.00E+00 | −1.00E+00 | −1.00E+00 | −1.00E+00 |
| 4th order coefficient | 3.73E−02 | −1.03E−02 | −4.00E−02 | −1.73E−02 | 1.39E−02 | −3.33E−02 | −1.21E−01 |
| 6th order coefficient | −4.74E−02 | 2.84E−02 | 3.39E−02 | −3.27E−02 | −3.83E−01 | 8.96E−02 | 4.93E−01 |
| 8th order coefficient | 3.12E−01 | −2.17E−01 | −6.30E−02 | 4.53E−01 | 3.76E+00 | −1.69E−01 | −3.25E+00 |
| 10th order coefficient | −1.20E+00 | 1.00E+00 | 3.90E−01 | −2.62E+00 | −2.41E+01 | −1.42E+00 | 1.40E+01 |
| 12th order coefficient | 2.97E+00 | −2.83E+00 | −1.38E+00 | 1.06E+01 | 1.06E+02 | 1.22E+01 | −4.11E+01 |
| 14th order coefficient | −5.04E+00 | 5.24E+00 | 3.02E+00 | −3.13E+01 | −3.27E+02 | −4.66E+01 | 8.42E+01 |
| 16th order coefficient | 6.06E+00 | −6.74E+00 | −4.49E+00 | 6.82E+01 | 7.24E+02 | 1.11E+02 | −1.22E+02 |
| 18th order coefficient | −5.23E+00 | 6.17E+00 | 4.74E+00 | −1.10E+02 | −1.16E+03 | −1.78E+02 | 1.27E+02 |
| 20th order coefficient | 3.25E+00 | −4.05E+00 | −3.61E+00 | 1.28E+02 | 1.34E+03 | 1.98E+02 | −9.45E+01 |
| 22nd order coefficient | −1.43E+00 | 1.89E+00 | 1.97E+00 | −1.08E+02 | −1.10E+03 | −1.53E+02 | 4.95E+01 |
| 24th order coefficient | 4.39E−01 | −6.12E−01 | −7.52E−01 | 6.29E+01 | 6.32E+02 | 8.07E+01 | −1.78E+01 |
| 26th order coefficient | −8.82E−02 | 1.31E−01 | 1.89E−01 | −2.41E+01 | −2.39E+02 | −2.76E+01 | 4.14E+00 |

TABLE 10-continued

| | | | | | | | |
|---|---|---|---|---|---|---|---|
| 28th order coefficient | 1.04E−02 | −1.66E−02 | −2.81E−02 | 5.47E+00 | 5.36E+01 | 5.50E+00 | −5.64E−01 |
| 30th order coefficient | −5.49E−04 | 9.40E−04 | 1.85E−03 | −5.52E−01 | −5.39E+00 | −4.83E−01 | 3.40E−02 |

| Surface No. | S8 | S9 | S10 | S11 | S12 | S13 | S14 |
|---|---|---|---|---|---|---|---|
| K | 0.00E+00 | 1.67E+01 | 0.00E+00 | 6.59E+00 | −1.37E+01 | 1.72E+01 | −8.75E+00 |
| 4th order coefficient | −9.93E−02 | −1.54E−01 | −1.82E−01 | 6.30E−03 | 4.31E−02 | −1.55E−01 | −9.56E−02 |
| 6th order coefficient | 3.37E−01 | 6.30E−02 | 9.72E−02 | −4.96E−02 | −3.23E−02 | 9.96E−02 | 5.93E−02 |
| 8th order coefficient | −2.23E+00 | −7.30E−02 | −6.87E−02 | 5.61E−02 | 4.61E−02 | −4.76E−02 | −3.07E−02 |
| 10th order coefficient | 1.02E+01 | 7.82E−01 | 8.48E−02 | −5.47E−02 | −4.96E−02 | 1.61E−02 | 1.21E−02 |
| 12th order coefficient | −3.16E+01 | −3.16E+00 | −1.03E−01 | 3.60E−02 | 3.09E−02 | −3.68E−03 | −3.62E−03 |
| 14th order coefficient | 6.87E+01 | 7.16E+00 | 8.69E−02 | −1.62E−02 | −1.24E−02 | 5.80E−04 | 8.23E−04 |
| 16th order coefficient | −1.06E+02 | −1.06E+01 | −4.86E−02 | 4.87E−03 | 3.41E−03 | −6.40E−05 | −1.39E−04 |
| 18th order coefficient | 1.19E+02 | 1.09E+01 | 1.86E−02 | −9.43E−04 | −6.49E−04 | 4.94E−06 | 1.73E−05 |
| 20th order coefficient | −9.61E+01 | −7.83E+00 | −4.99E−03 | 1.12E−04 | 8.66E−05 | −2.64E−07 | −1.56E−06 |
| 22nd order coefficient | 5.56E+01 | 3.94E+00 | 9.36E−04 | −7.43E−06 | −8.03E−06 | 9.37E−09 | 1.01E−07 |
| 24th order coefficient | −2.24E+01 | −1.36E+00 | −1.21E−04 | 2.10E−07 | 5.07E−07 | −2.00E−10 | −4.50E−09 |
| 26th order coefficient | 5.97E+00 | 3.08E−01 | 1.02E−05 | 0.00E+00 | −2.07E−08 | 1.85E−12 | 1.32E−10 |
| 28th order coefficient | −9.43E−01 | −4.09E−02 | −5.07E−07 | 0.00E+00 | 4.93E−10 | 9.28E−15 | −2.29E−12 |
| 30th order coefficient | 6.68E−02 | 2.42E−03 | 1.13E−08 | 0.00E+00 | −5.21E−12 | −2.43E−16 | 1.77E−14 |

Figure 11:
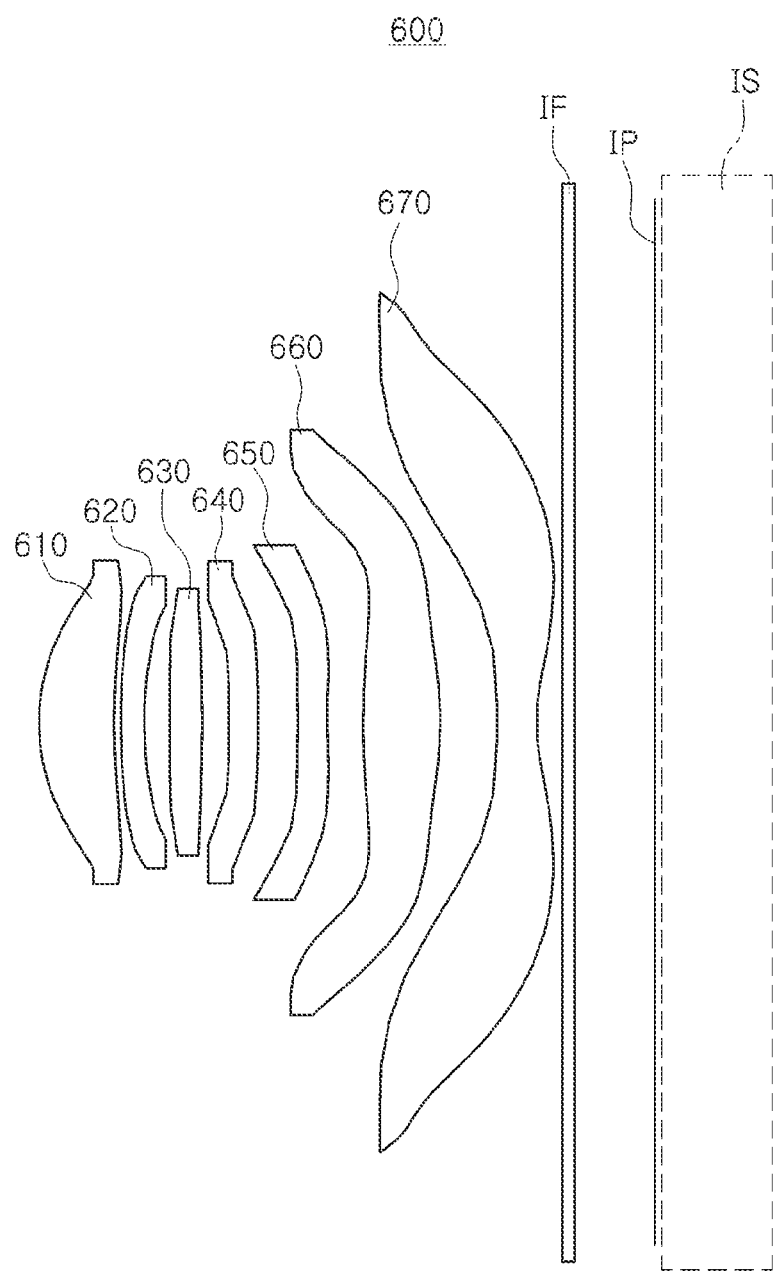
FIG. 11 is a block diagram of an imaging lens system according to a sixth example.

An imaging lens system according to a sixth example will be described with reference to FIG. 11.

An imaging lens system 600 includes a first lens 610, a second lens 620, a third lens 630, a fourth lens 640, a fifth lens 650, a sixth lens 660, and a seventh lens 670.

The first lens 610 has positive refractive power, and has a convex object-side surface and a concave image-side surface. The second lens 620 has negative refractive power, and has a convex object-side surface and a concave image-side surface. The third lens 630 has positive refractive power, and has a convex object-side surface and a convex image-side surface. The fourth lens 640 has negative refractive power, and has a concave object-side surface and a concave image-side surface. The fifth lens 650 has negative refractive power, and has a convex object-side surface and a concave image-side surface. In addition, an inflection point is formed on the object-side surface and the image-side surface of the fifth lens 650. The sixth lens 660 has positive refractive power, and has a convex object-side surface and a convex image-side surface. In addition, an inflection point is formed on the object-side surface and the image-side surface of the sixth lens 660. The seventh lens 670 has negative refractive power, and has a concave object-side surface and a concave image-side surface. In addition, an inflection point is formed on the object-side surface and the image-side surface of the seventh lens 670.

The imaging lens system 600 may further include a filter IF, and an imaging plane IP. The filter IF may be disposed between the seventh lens 670 and the imaging plane IP. The imaging plane IP may be formed in a position in which light incident from the first lens 610 to the seventh lens 670 is formed. For example, the imaging plane IP may be formed on one surface of the image sensor IS of the camera module or inside the image sensor IS.

Figure 12:
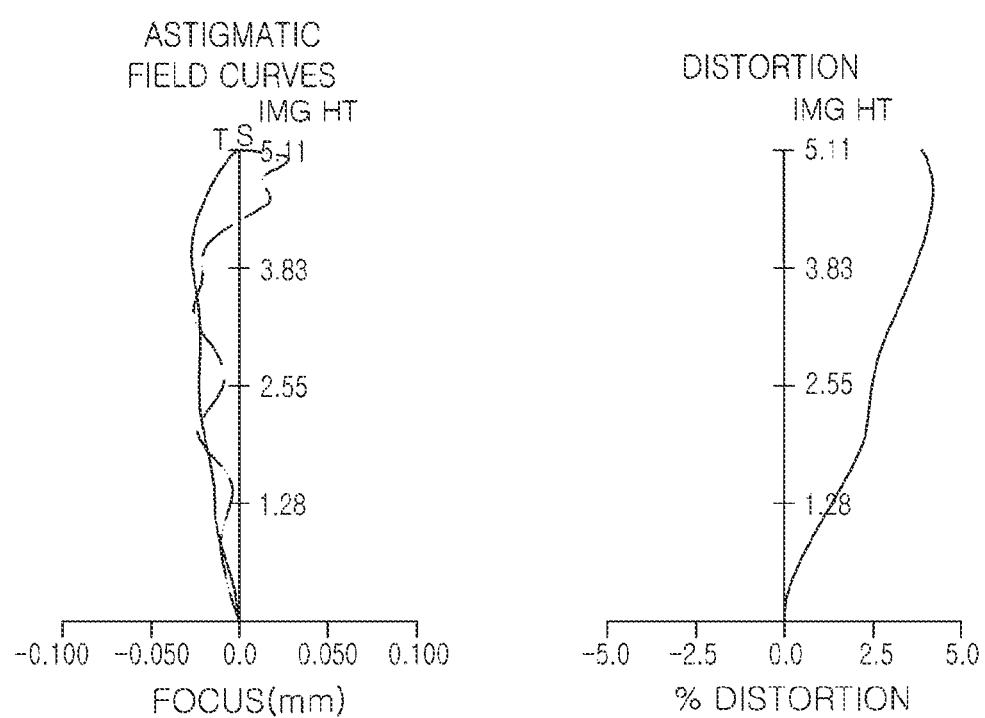
FIG. 12 is an aberration curve of the imaging lens system illustrated in FIG. 11.

The imaging lens system 600 configured as above may exhibit aberration characteristics as illustrated in FIG. 12. Tables 11 and 12 illustrate lens characteristics and aspheric values of the imaging lens system 600.

TABLE 11

| Surface No. | Reference | Radius of curvature | Thickness/distance | Refractive index | Abbe number |
|---|---|---|---|---|---|
| S1 | First lens | 1.9039 | 0.707 | 1.546 | 56.1 |
| S2 | | 6.4826 | 0.061 | | |
| S3 | Second lens | 6.0171 | 0.220 | 1.689 | 18.2 |
| S4 | | 3.8262 | 0.236 | | |
| S5 | Third lens | 19.5000 | 0.308 | 1.642 | 23.9 |
| S6 | | −25.5930 | 0.255 | | |
| S7 | Fourth lens | −35.0542 | 0.274 | 1.680 | 19.2 |
| S8 | | 70.3150 | 0.370 | | |
| S9 | Fifth lens | 15.0000 | 0.281 | 1.571 | 37.4 |
| S10 | | 6.0708 | 0.340 | | |
| S11 | Sixth lens | 7.1151 | 0.725 | 1.547 | 56.1 |

TABLE 11-continued

| Surface No. | Reference | Radius of curvature | Thickness/distance | Refractive index | Abbe number |
|---|---|---|---|---|---|
| S12 | | −3.0552 | 0.531 | | |
| S13 | Seventh lens | −19.1881 | 0.380 | 1.547 | 56.1 |
| S14 | | 1.8409 | 0.237 | | |
| S15 | Filter | Infinity | 0.110 | 1.519 | 64.2 |
| S16 | | Infinity | 0.763 | | |
| S17 | Imaging plane | Infinity | 0.000 | | |

TABLE 12

| Surface No. | S1 | S2 | S3 | S4 | S5 | S6 | S7 |
|---|---|---|---|---|---|---|---|
| K | −2.02E+00 | −4.71E+01 | 1.54E+01 | 7.00E+00 | −1.00E+00 | −1.00E+00 | −1.00E+00 |
| 4th order coefficient | 3.79E−02 | −9.25E−03 | −3.98E−02 | −1.72E−02 | 1.23E−02 | −3.30E−02 | −1.21E−01 |
| 6th order coefficient | −5.08E−02 | 1.79E−02 | 2.88E−02 | −3.66E−02 | −3.57E−01 | 9.89E−02 | 4.93E−01 |
| 8th order coefficient | 3.30E−01 | −1.54E−01 | −3.27E−02 | 4.93E−01 | 3.51E+00 | −3.34E−01 | −3.25E+00 |
| 10th order coefficient | −1.26E+00 | 7.73E−01 | 2.98E−01 | −2.88E+00 | −2.26E+01 | −1.88E−02 | 1.40E+01 |
| 12th order coefficient | 3.12E+00 | −2.27E+00 | −1.24E+00 | 1.18E+01 | 9.94E+01 | 4.92E+00 | −4.11E+01 |
| 14th order coefficient | −5.30E+00 | 4.32E+00 | 2.98E+00 | −3.52E+01 | −3.09E+02 | −2.15E+01 | 8.42E+01 |
| 16th order coefficient | 6.39E+00 | −5.66E+00 | −4.78E+00 | 7.76E+01 | 6.86E+02 | 5.05E+01 | −1.22E+02 |
| 18th order coefficient | −5.55E+00 | 5.26E+00 | 5.39E+00 | −1.25E+02 | −1.10E+03 | −7.49E+01 | 1.27E+02 |
| 20th order coefficient | 3.48E+00 | −3.50E+00 | −4.33E+00 | 1.48E+02 | 1.28E+03 | 7.26E+01 | −9.45E+01 |
| 22nd order coefficient | −1.56E+00 | 1.65E+00 | 2.47E+00 | −1.24E+02 | −1.06E+03 | −4.51E+01 | 4.95E+01 |
| 24th order coefficient | 4.86E−01 | −5.42E−01 | −9.77E−01 | 7.28E+01 | 6.10E+02 | 1.63E+01 | −1.78E+01 |
| 26th order coefficient | −1.00E−01 | 1.17E−01 | 2.53E−01 | −2.80E+01 | −2.32E+02 | −2.30E+00 | 4.14E+00 |
| 28th order coefficient | 1.22E−02 | −1.50E−02 | −3.85E−02 | 6.34E+00 | 5.21E+01 | −3.82E−01 | −5.64E−01 |
| 30th order coefficient | −6.71E−04 | 8.58E−04 | 2.59E−03 | −6.41E−01 | −5.26E+00 | 1.31E−01 | 3.40E−02 |

| Surface No. | S8 | S9 | S10 | S11 | S12 | S13 | S14 |
|---|---|---|---|---|---|---|---|
| K | 0.00E+00 | 1.92E+01 | 0.00E+00 | 6.59E+00 | −1.36E+01 | 1.73E+01 | −8.68E+00 |
| 4th order coefficient | −1.02E−01 | −1.55E−01 | −1.82E−01 | 6.62E−03 | 4.41E−02 | −1.54E−01 | −9.57E−02 |
| 6th order coefficient | 3.56E−01 | 6.23E−02 | 9.78E−02 | −5.15E−02 | −3.41E−02 | 9.77E−02 | 5.90E−02 |
| 8th order coefficient | −2.34E+00 | −4.58E−02 | −6.90E−02 | 6.00E−02 | 4.81E−02 | −4.58E−02 | −3.03E−02 |
| 10th order coefficient | 1.06E+01 | 6.47E−01 | 8.55E−02 | −5.87E−02 | −5.07E−02 | 1.52E−02 | 1.18E−02 |
| 12th order coefficient | −3.29E+01 | −2.80E+00 | −1.05E−01 | 3.85E−02 | 3.12E−02 | −3.42E−03 | −3.52E−03 |
| 14th order coefficient | 7.13E+01 | 6.57E+00 | 8.91E−02 | −1.72E−02 | −1.24E−02 | 5.29E−04 | 7.95E−04 |
| 16th order coefficient | −1.10E+02 | −9.97E+00 | −5.01E−02 | 5.12E−03 | 3.36E−03 | −5.68E−05 | −1.34E−04 |
| 18th order coefficient | 1.23E+02 | 1.04E+01 | 1.93E−02 | −9.86E−04 | −6.35E−04 | 4.23E−06 | 1.66E−05 |
| 20th order coefficient | −9.99E+01 | −7.58E+00 | −5.17E−03 | 1.17E−04 | 8.40E−05 | −2.13E−07 | −1.49E−06 |
| 22nd order coefficient | 5.78E+01 | 3.87E+00 | 9.68E−04 | −7.72E−06 | −7.73E−06 | 6.69E−09 | 9.60E−08 |
| 24th order coefficient | −2.33E+01 | −1.35E+00 | −1.24E−04 | 2.18E−07 | 4.84E−07 | −1.01E−10 | −4.28E−09 |
| 26th order coefficient | 6.21E+00 | 3.08E−01 | 1.05E−05 | 0.00E+00 | −1.96E−08 | −5.52E−13 | 1.25E−10 |
| 28th order coefficient | −9.82E−01 | −4.12E−02 | −5.18E−07 | 0.00E+00 | 4.65E−10 | 4.43E−14 | −2.17E−12 |
| 30th order coefficient | 6.96E−02 | 2.45E−03 | 1.15E−08 | 0.00E+00 | −4.87E−12 | −4.74E−16 | 1.68E−14 |

Figure 13:
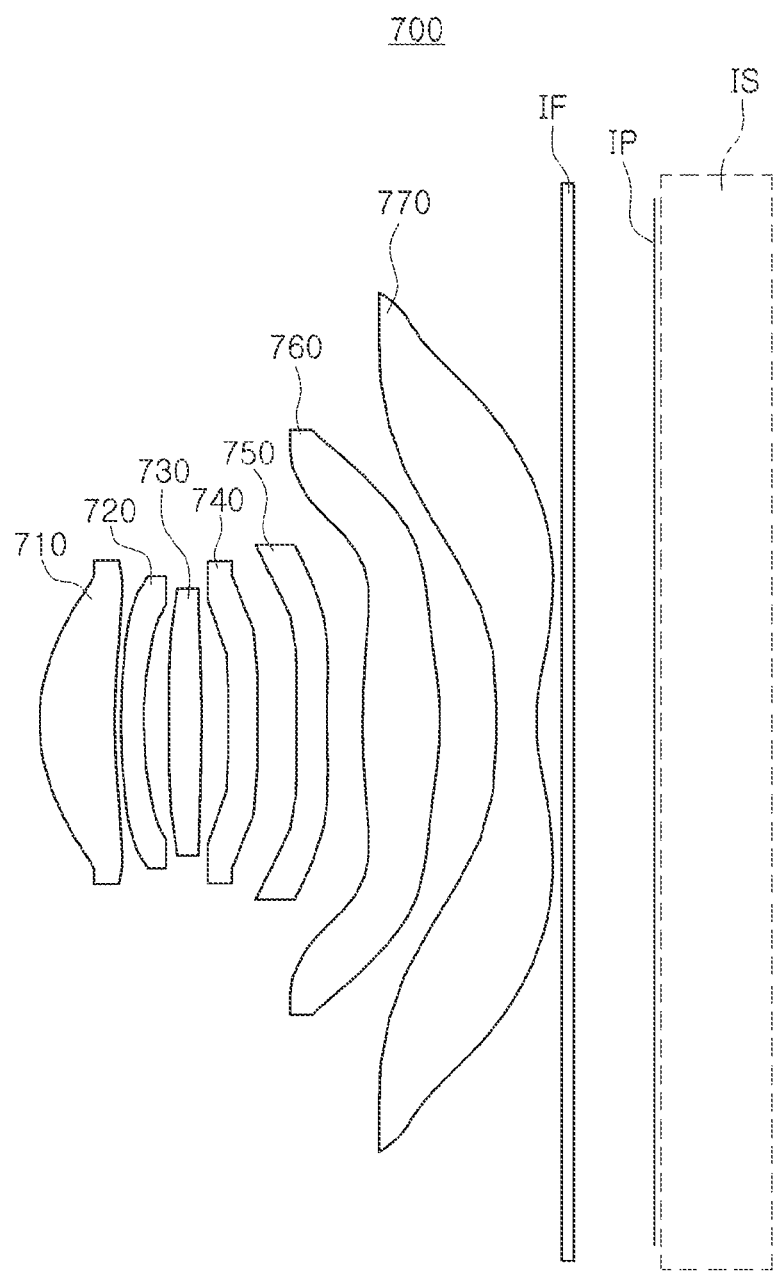
FIG. 13 is a block diagram of an imaging lens system according to a seventh example.

An imaging lens system according to a seventh example will be described with reference to FIG. 13.

An imaging lens system 700 includes a first lens 710, a second lens 720, a third lens 730, a fourth lens 740, a fifth lens 750, a sixth lens 760, and a seventh lens 770.

The first lens 710 has positive refractive power, and has a convex object-side surface and a concave image-side surface. The second lens 720 has negative refractive power, and has a convex object-side surface and a concave image-side surface. The third lens 730 has positive refractive power, and has a convex object-side surface and a convex image-side surface. The fourth lens 740 has negative refractive power, and has a concave object-side surface and a concave image-side surface. The fifth lens 750 has negative refractive power, and has a convex object-side surface and a concave image-side surface. In addition, an inflection point is formed on the object-side surface and the image-side surface of the fifth lens 750. The sixth lens 760 has positive refractive power, and has a convex object-side surface and a convex image-side surface. In addition, an inflection point is formed on the object-side surface and the image-side surface of the sixth lens 760. The seventh lens 770 has negative refractive power, and has a concave object-side surface and a concave image-side surface. In addition, an inflection point is formed on the object-side surface and the image-side surface of the seventh lens 770.

The imaging lens system 700 may further include a filter IF, and an imaging plane IP. The filter IF may be disposed between the seventh lens 770 and the imaging plane IP. The imaging plane IP may be formed in a position in which light incident from the first lens 710 to the seventh lens 770 is formed. For example, the imaging plane IP may be formed on one surface of the image sensor IS of the camera module or inside the image sensor IS.

Figure 14:
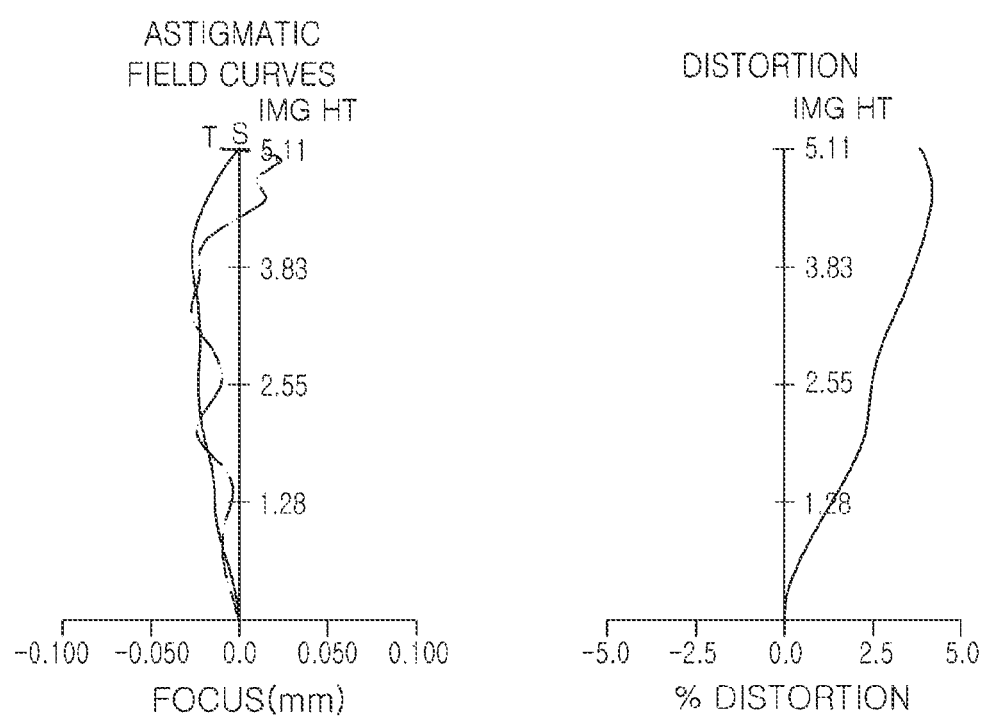
FIG. 14 is an aberration curve of the imaging lens system illustrated in FIG. 13.

The imaging lens system 700 configured as above may exhibit aberration characteristics as illustrated in FIG. 14. Tables 13 and 14 illustrate lens characteristics and aspheric values of the imaging lens system 700.

TABLE 13

| Surface No. | Reference | Radius of curvature | Thickness/distance | Refractive index | Abbe number |
|---|---|---|---|---|---|
| S1 | First lens | 1.9018 | 0.709 | 1.546 | 56.0 |
| S2 | | 6.4346 | 0.059 | | |
| S3 | Second lens | 5.8971 | 0.210 | 1.689 | 18.2 |
| S4 | | 3.7949 | 0.240 | | |
| S5 | Third lens | 19.0000 | 0.306 | 1.537 | 55.7 |
| S6 | | −28.2273 | 0.254 | | |
| S7 | Fourth lens | −40.0000 | 0.276 | 1.679 | 19.2 |
| S8 | | 61.3154 | 0.371 | | |
| S9 | Fifth lens | 15.0000 | 0.283 | 1.641 | 24.0 |
| S10 | | 6.0339 | 0.339 | | |
| S11 | Sixth lens | 7.0927 | 0.725 | 1.570 | 37.4 |
| S12 | | −3.0798 | 0.532 | | |
| S13 | Seventh lens | −19.3890 | 0.385 | 1.537 | 55.7 |
| S14 | | 1.8550 | 0.238 | | |
| S15 | Filter | Infinity | 0.110 | 1.519 | 64.2 |
| S16 | | Infinity | 0.762 | | |
| S17 | Imaging plane | Infinity | 0.000 | | |

TABLE 14

| Surface No. | S1 | S2 | S3 | S4 | S5 | S6 | S7 |
|---|---|---|---|---|---|---|---|
| K | −2.00E+00 | −4.63E+01 | 1.48E+01 | 6.87E+00 | −1.00E+00 | −1.00E+00 | −1.00E+00 |
| 4th order coefficient | 3.79E−02 | −9.25E−03 | −4.04E−02 | −1.74E−02 | 1.24E−02 | −3.35E−02 | −1.21E−01 |
| 6th order coefficient | −5.08E−02 | 1.79E−02 | 2.94E−02 | −3.71E−02 | −3.60E−01 | 1.01E−01 | 4.93E−01 |
| 8th order coefficient | 3.29E−01 | −1.54E−01 | −3.36E−02 | 5.01E−01 | 3.55E+00 | −3.44E−01 | −3.25E+00 |
| 10th order coefficient | −1.26E+00 | 7.74E−01 | 3.08E−01 | −2.93E+00 | −2.29E+01 | −1.95E−02 | 1.40E+01 |
| 12th order coefficient | 3.11E+00 | −2.27E+00 | −1.29E+00 | 1.20E+01 | 1.01E+02 | 5.15E+00 | −4.11E+01 |
| 14th order coefficient | −5.28E+00 | 4.32E+00 | 3.13E+00 | −3.62E+01 | −3.15E+02 | −2.27E+01 | 8.42E+01 |
| 16th order coefficient | 6.37E+00 | −5.66E+00 | −5.05E+00 | 8.00E+01 | 7.02E+02 | 5.36E+01 | −1.22E+02 |
| 18th order coefficient | −5.53E+00 | 5.26E+00 | 5.72E+00 | −1.30E+02 | −1.13E+03 | −8.00E+01 | 1.27E+02 |
| 20th order coefficient | 3.46E+00 | −3.50E+00 | −4.63E+00 | 1.54E+02 | 1.31E+03 | 7.81E+01 | −9.45E+01 |
| 22nd order coefficient | −1.55E+00 | 1.65E+00 | 2.66E+00 | −1.30E+02 | −1.09E+03 | −4.89E+01 | 4.95E+01 |
| 24th order coefficient | 4.83E−01 | −5.43E−01 | −1.06E+00 | 7.63E+01 | 6.30E+02 | 1.78E+01 | −1.78E+01 |
| 26th order coefficient | −9.95E−02 | 1.17E−01 | 2.76E−01 | −2.94E+01 | −2.40E+02 | −2.53E+00 | 4.14E+00 |

TABLE 14-continued

| | | | | | | | |
|---|---|---|---|---|---|---|---|
| 28th order coefficient | 1.22E−02 | −1.50E−02 | −4.23E−02 | 6.70E+00 | 5.41E+01 | −4.23E−01 | −5.64E−01 |
| 30th order coefficient | −6.66E−04 | 8.60E−04 | 2.87E−03 | −6.79E−01 | −5.47E+00 | 1.46E−01 | 3.40E−02 |

| Surface No. | S8 | S9 | S10 | S11 | S12 | S13 | S14 |
|---|---|---|---|---|---|---|---|
| K | 0.00E+00 | 2.22E+01 | 0.00E+00 | 6.54E+00 | −1.35E+01 | 1.78E+01 | −8.70E+00 |
| 4th order coefficient | −1.02E−01 | −1.56E−01 | −1.82E−01 | 6.63E−03 | 4.41E−02 | −1.54E−01 | −9.55E−02 |
| 6th order coefficient | 3.55E−01 | 6.29E−02 | 9.79E−02 | −5.15E−02 | −3.42E−02 | 9.72E−02 | 5.88E−02 |
| 8th order coefficient | −2.33E+00 | −4.63E−02 | −6.92E−02 | 6.02E−02 | 4.81E−02 | −4.55E−02 | −3.01E−02 |
| 10th order coefficient | 1.06E+01 | 6.56E−01 | 8.57E−02 | −5.89E−02 | −5.07E−02 | 1.51E−02 | 1.17E−02 |
| 12th order coefficient | −3.28E+01 | −2.85E+00 | −1.06E−01 | 3.86E−02 | 3.12E−02 | −3.39E−03 | −3.49E−03 |
| 14th order coefficient | 7.11E+01 | 6.70E+00 | 8.93E−02 | −1.72E−02 | −1.24E−02 | 5.23E−04 | 7.87E−04 |
| 16th order coefficient | −1.10E+02 | −1.02E+01 | −5.03E−02 | 5.14E−03 | 3.37E−03 | −5.61E−05 | −1.32E−04 |
| 18th order coefficient | 1.23E+02 | 1.07E+01 | 1.93E−02 | −9.91E−04 | −6.36E−04 | 4.17E−06 | 1.64E−05 |
| 20th order coefficient | −9.96E+01 | −7.80E+00 | −5.19E−03 | 1.17E−04 | 8.41E−05 | −2.09E−07 | −1.47E−06 |
| 22nd order coefficient | 5.76E+01 | 3.99E+00 | 9.73E−04 | −7.78E−06 | −7.75E−06 | 6.57E−09 | 9.44E−08 |
| 24th order coefficient | −2.32E+01 | −1.40E+00 | −1.25E−04 | 2.20E−07 | 4.85E−07 | −9.93E−11 | −4.20E−09 |
| 26th order coefficient | 6.19E+00 | 3.20E−01 | 1.05E−05 | 0.00E+00 | −1.97E−08 | −5.41E−13 | 1.23E−10 |
| 28th order coefficient | −9.78E−01 | −4.29E−02 | −5.21E−07 | 0.00E+00 | 4.66E−10 | 4.33E−14 | −2.12E−12 |
| 30th order coefficient | 6.92E−02 | 2.56E−03 | 1.15E−08 | 0.00E+00 | −4.88E−12 | −4.63E−16 | 1.64E−14 |

Figure 15:
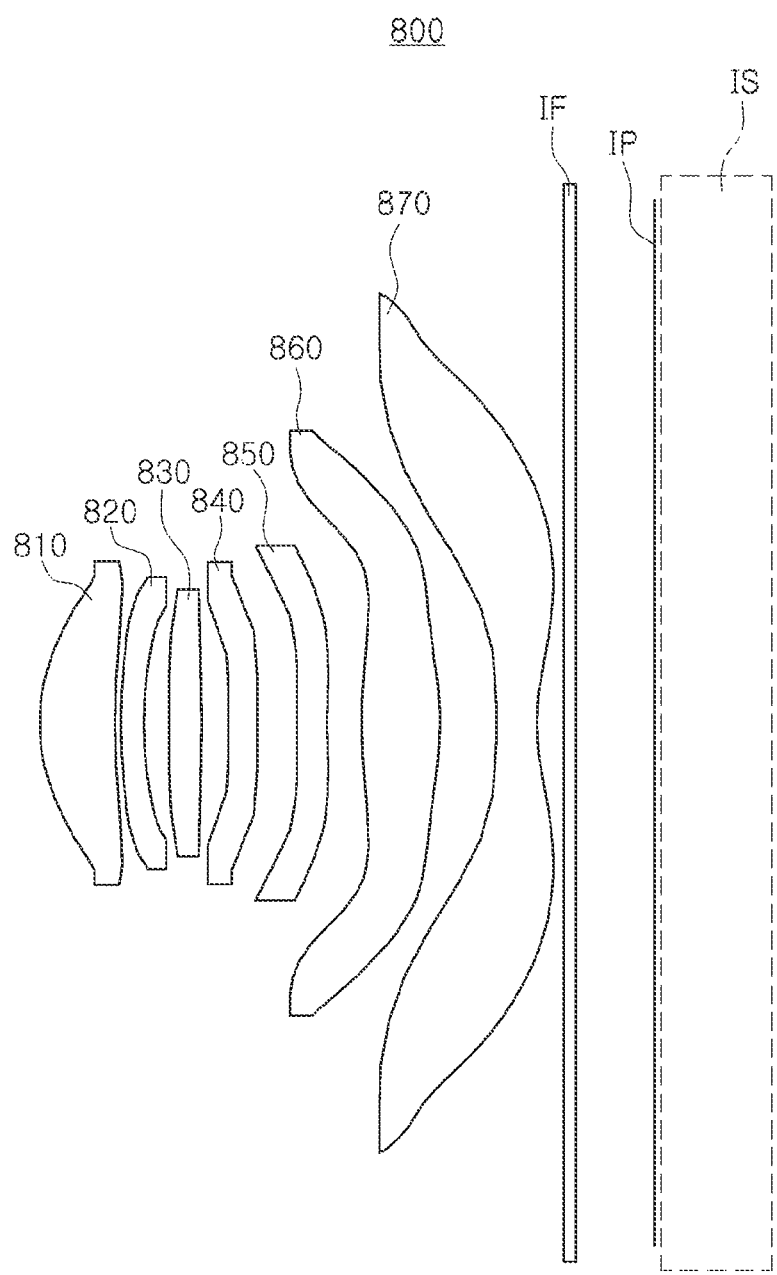
FIG. 15 is a block diagram of an imaging lens system according to an eighth example.

An imaging lens system according to an eighth example will be described with reference to FIG. 15.

An imaging lens system 800 includes a first lens 810, a second lens 820, a third lens 830, a fourth lens 840, a fifth lens 850, a sixth lens 860, and a seventh lens 870.

The first lens 810 has positive refractive power, and has a convex object-side surface and a concave image-side surface. The second lens 820 has negative refractive power, and has a convex object-side surface and a concave image-side surface. The third lens 830 has positive refractive power, and has a convex object-side surface and a convex image-side surface. The fourth lens 840 has negative refractive power, and has a concave object-side surface and a concave image-side surface. The fifth lens 850 has negative refractive power, and has a convex object-side surface and a concave image-side surface. In addition, an inflection point is formed on the object-side surface and the image-side surface of the fifth lens 850. The sixth lens 860 has positive refractive power, and has a convex object-side surface and a convex image-side surface. In addition, an inflection point is formed on the object-side surface and the image-side surface of the sixth lens 860. The seventh lens 870 has negative refractive power, and has a concave object-side surface and a concave image-side surface. In addition, an inflection point is formed on the object-side surface and the image-side surface of the seventh lens 870.

The imaging lens system 800 may further include a filter IF, and an imaging plane IP. The filter IF may be disposed between the seventh lens 870 and the imaging plane IP. The imaging plane IP may be formed in a position in which light incident from the first lens 810 to the seventh lens 870 is formed. For example, the imaging plane IP may be formed on one surface of the image sensor IS of the camera module or inside the image sensor IS.

Figure 16:
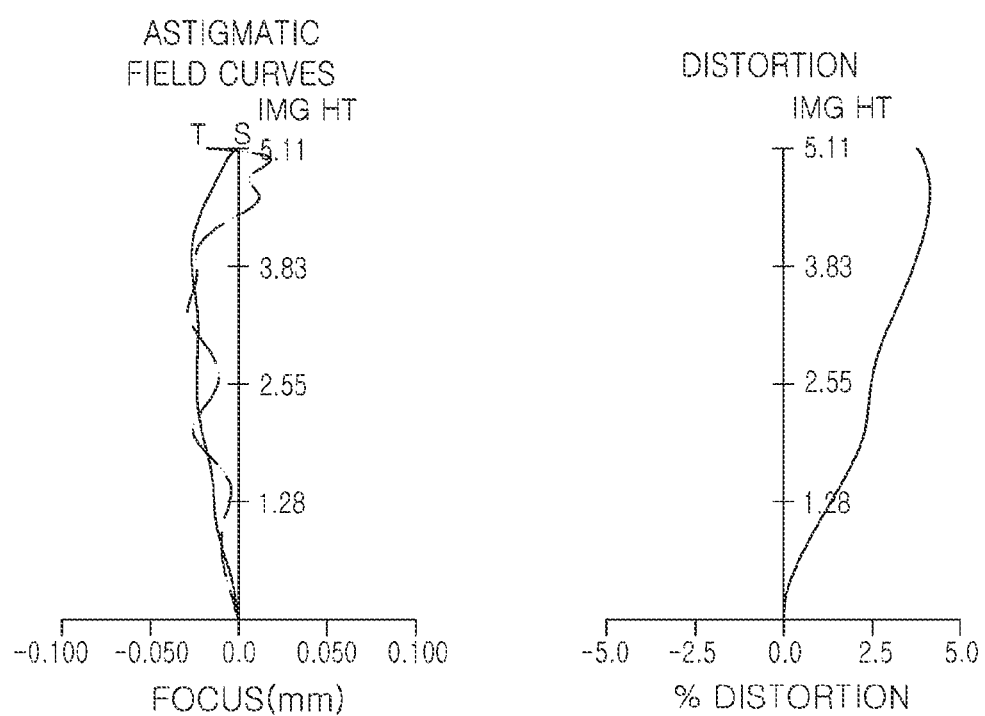
FIG. 16 is an aberration curve of the imaging lens system illustrated in FIG. 15.

The imaging lens system 800 configured as above may exhibit aberration characteristics as illustrated in FIG. 16. Tables 15 and 16 illustrate lens characteristics and aspheric values of the imaging lens system 800.

TABLE 15

| Surface No. | Reference | Radius of curvature | Thickness/distance | Refractive index | Abbe number |
|---|---|---|---|---|---|
| S1 | First lens | 1.9033 | 0.715 | 1.546 | 56.1 |
| S2 | | 6.3938 | 0.057 | | |
| S3 | Second lens | 5.7866 | 0.200 | 1.689 | 18.2 |
| S4 | | 3.7699 | 0.243 | | |
| S5 | Third lens | 18.0000 | 0.304 | 1.642 | 23.9 |
| S6 | | −32.2422 | 0.256 | | |
| S7 | Fourth lens | −45.0000 | 0.276 | 1.680 | 19.2 |
| S8 | | 56.4577 | 0.370 | | |
| S9 | Fifth lens | 15.0000 | 0.284 | 1.571 | 37.4 |
| S10 | | 5.9889 | 0.338 | | |
| S11 | Sixth lens | 7.0529 | 0.725 | 1.547 | 56.1 |

TABLE 15-continued

| Surface No. | Reference | Radius of curvature | Thickness/distance | Refractive index | Abbe number |
|---|---|---|---|---|---|
| S12 | | −3.0942 | 0.534 | | |
| S13 | Seventh lens | −19.6424 | 0.388 | 1.547 | 56.1 |
| S14 | | 1.8585 | 0.260 | | |
| S15 | Filter | Infinity | 0.110 | 1.519 | 64.2 |
| S16 | | Infinity | 0.740 | | |
| S17 | Imaging plane | Infinity | −0.011 | | |

TABLE 16

| Surface No. | S1 | S2 | S3 | S4 | S5 | S6 | S7 |
|---|---|---|---|---|---|---|---|
| K | −1.97E+00 | −4.52E+01 | 1.41E+01 | 6.66E+00 | −1.00E+00 | −1.00E+00 | −1.00E+00 |
| 4th order coefficient | 3.74E−02 | −9.14E−03 | −4.06E−02 | −1.73E−02 | 1.24E−02 | −3.37E−02 | −1.21E−01 |
| 6th order coefficient | −4.98E−02 | 1.75E−02 | 2.96E−02 | −3.69E−02 | −3.57E−01 | 1.02E−01 | 4.93E−01 |
| 18th order coefficient | 3.21E−01 | −1.51E−01 | −3.39E−02 | 4.99E−01 | 3.52E+00 | −3.47E−01 | −3.25E+00 |
| 10th order coefficient | −1.22E+00 | 7.50E−01 | 3.12E−01 | −2.91E+00 | −2.26E+01 | −1.97E−02 | 1.40E+01 |
| 12th order coefficient | 3.00E+00 | −2.19E+00 | −1.31E+00 | 1.20E+01 | 9.98E+01 | 5.22E+00 | −4.11E+01 |
| 14th order coefficient | −5.06E+00 | 4.14E+00 | 3.18E+00 | −3.59E+01 | −3.10E+02 | −2.30E+01 | 8.42E+01 |
| 16th order coefficient | 6.06E+00 | −5.39E+00 | −5.15E+00 | 7.93E+01 | 6.90E+02 | 5.45E+01 | −1.22E+02 |
| 18th order coefficient | −5.23E+00 | 4.98E+00 | 5.85E+00 | −1.29E+02 | −1.11E+03 | −8.16E+01 | 1.27E+02 |
| 20th order coefficient | 3.26E+00 | −3.29E+00 | −4.75E+00 | 1.52E+02 | 1.29E+03 | 7.99E+01 | −9.45E+01 |
| 22nd order coefficient | −1.45E+00 | 1.54E+00 | 2.74E+00 | −1.28E+02 | −1.07E+03 | −5.01E+01 | 4.95E+01 |
| 24th order coefficient | 4.49E−01 | −5.03E−01 | −1.09E+00 | 7.52E+01 | 6.14E+02 | 1.83E+01 | −1.78E+01 |
| 26th order coefficient | −9.19E−02 | 1.08E−01 | 2.85E−01 | −2.90E+01 | −2.33E+02 | −2.60E+00 | 4.14E+00 |
| 28th order coefficient | 1.11E−02 | −1.38E−02 | −4.38E−02 | 6.59E+00 | 5.25E+01 | −4.37E−01 | −5.64E−01 |
| 30th order coefficient | −6.07E−04 | 7.83E−04 | 2.97E−03 | −6.67E−01 | −5.30E+00 | 1.51E−01 | 3.40E−02 |

| Surface No. | S8 | S9 | S10 | S11 | S12 | S13 | S14 |
|---|---|---|---|---|---|---|---|
| K | 0.00E+00 | 2.58E+01 | 0.00E+00 | 6.46E+00 | −1.36E+01 | 1.83E+01 | −8.69E+00 |
| 4th order coefficient | −1.02E−01 | −1.56E−01 | −1.83E−01 | 6.66E−03 | 4.42E−02 | −1.54E−01 | −9.52E−02 |
| 6th order coefficient | 3.55E−01 | 6.34E−02 | 9.82E−02 | −5.19E−02 | −3.43E−02 | 9.68E−02 | 5.85E−02 |
| 8th order coefficient | −2.34E+00 | −4.68E−02 | −6.95E−02 | 6.06E−02 | 4.84E−02 | −4.52E−02 | −2.99E−02 |
| 10th order coefficient | 1.06E+01 | 6.65E−01 | 8.62E−02 | −5.94E−02 | −5.10E−02 | 1.50E−02 | 1.16E−02 |
| 12th order coefficient | −3.29E+01 | −2.89E+00 | −1.06E−01 | 3.91E−02 | 3.15E−02 | −3.36E−03 | −3.46E−03 |
| 14th order coefficient | 7.13E+01 | 6.83E+00 | 9.01E−02 | −1.75E−02 | −1.25E−02 | 5.18E−04 | 7.79E−04 |
| 16th order coefficient | −1.10E+02 | −1.04E+01 | −5.08E−02 | 5.23E−03 | 3.40E−03 | −5.55E−05 | −1.31E−04 |
| 18th order coefficient | 1.23E+02 | 1.09E+01 | 1.96E−02 | −1.01E−03 | −6.43E−04 | 4.12E−06 | 1.62E−05 |
| 20th order coefficient | −9.98E+01 | −8.02E+00 | −5.25E−03 | 1.20E−04 | 8.53E−05 | −2.06E−07 | −1.45E−06 |
| 22nd order coefficient | 5.78E+01 | 4.11E+00 | 9.86E−04 | −7.95E−06 | −7.86E−06 | 6.47E−09 | 9.29E−08 |
| 24th order coefficient | −2.33E+01 | −1.45E+00 | −1.27E−04 | 2.25E−07 | 4.93E−07 | −9.76E−11 | −4.13E−09 |
| 26th order coefficient | 6.21E+00 | 3.31E−01 | 1.07E−05 | 0.00E+00 | −2.00E−08 | −5.30E−13 | 1.21E−10 |
| 28th order coefficient | −9.81E−01 | −4.46E−02 | −5.30E−07 | 0.00E+00 | 4.75E−10 | 4.24E−14 | −2.08E−12 |
| 30th order coefficient | 6.95E−02 | 2.67E−03 | 1.17E−08 | 0.00E+00 | −4.98E−12 | −4.53E−16 | 1.60E−14 |

Tables 17 to 19 illustrate optical characteristic values and conditional expressional values of an imaging lens system according to first to eighth examples.

TABLE 17

| Reference | First example | Second example | Third example | Fourth example |
|---|---|---|---|---|
| f | 5.0500 | 5.0500 | 5.0500 | 5.0500 |
| f1 | 4.6808 | 4.6710 | 4.5943 | 4.6743 |
| f2 | −15.9625 | −15.9213 | −14.1533 | −15.9148 |
| f3 | 20.9946 | 21.1899 | 19.6326 | 20.9751 |
| f4 | −35.9020 | −36.8248 | −22.1166 | −36.4166 |
| f5 | −16.0293 | −15.4644 | −20.8986 | −15.6639 |
| f6 | 3.8366 | 3.8201 | 3.7124 | 3.8283 |
| f7 | −3.0850 | −3.1046 | −2.9881 | −3.0987 |
| TTL | 5.7994 | 5.8002 | 5.7995 | 5.8002 |
| BFL | 1.1094 | 1.1102 | 1.0801 | 1.1102 |
| f number | 1.930 | 1.920 | 1.930 | 1.920 |
| IMG HT | 5.110 | 5.110 | 5.110 | 5.110 |
| FOV | 88.30 | 88.00 | 88.30 | 88.00 |

| Reference | Fifth example | Sixth example | Seventh example | Eighth example |
|---|---|---|---|---|
| f | 5.0500 | 5.0500 | 5.0500 | 5.0500 |
| f1 | 4.6767 | 4.6786 | 4.6826 | 4.6962 |
| f2 | −15.9298 | −15.9000 | −16.1039 | −16.3589 |
| f3 | 20.8362 | 20.6537 | 21.1897 | 21.5507 |
| f4 | −35.0255 | −34.4205 | −35.6186 | −36.8446 |
| f5 | −15.9665 | −16.1057 | −15.9424 | −15.7446 |
| f6 | 3.8389 | 3.8446 | 3.8625 | 3.8686 |
| f7 | −3.1056 | −3.1075 | −3.1321 | −3.1411 |
| TTL | 5.8002 | 5.8002 | 5.8003 | 5.7890 |
| BFL | 1.1102 | 1.1102 | 1.1103 | 1.0990 |
| f number | 2.080 | 1.930 | 1.930 | 1.930 |
| IMG HT | 5.110 | 5.110 | 5.110 | 5.110 |
| FOV | 88.10 | 88.10 | 88.10 | 88.10 |

TABLE 18

| Conditional expression | First example | Second example | Third example | Fourth example |
|---|---|---|---|---|
| TTL/2ImgHT | 0.5675 | 0.5675 | 0.5675 | 0.5675 |
| f1/f | 0.9269 | 0.9249 | 0.9098 | 0.9256 |
| V1-V2 | 37.8000 | 37.8000 | 36.8000 | 37.8000 |
| V1-V3 | 0.3000 | 0.3000 | 0.3000 | 0.3000 |
| V1-V5 | 32.0000 | 32.0000 | 32.0000 | 32.0000 |
| f2/f | −3.1609 | −3.1527 | −2.8026 | −3.1514 |
| f3/f | 4.1574 | 4.1960 | 3.8876 | 4.1535 |
| f4/f | −7.1093 | −7.2920 | −4.3795 | −7.2112 |
| f5/f | −3.1741 | −3.0623 | −4.1383 | −3.1018 |
| f6/f | 0.7597 | 0.7564 | 0.7351 | 0.7581 |
| f7/f | −0.6109 | −0.6148 | −0.5917 | −0.6136 |
| TTL/f | 1.1484 | 1.1486 | 1.1484 | 1.1486 |
| |f1/f2| | 0.2932 | 0.2934 | 0.3246 | 0.2937 |
| f2/f3 | −0.7603 | −0.7514 | −0.7209 | −0.7587 |
| BFL/f | 0.2197 | 0.2198 | 0.2139 | 0.2198 |
| D12/f | 0.0118 | 0.0120 | 0.0176 | 0.0120 |
| D12/D23 | 0.2538 | 0.2548 | 0.3453 | 0.2541 |
| D23/D34 | 0.9401 | 0.9597 | 0.8588 | 0.9471 |
| D56/D67 | 0.6363 | 0.6284 | 0.6628 | 0.6338 |

TABLE 19

| Conditional expression | Fifth example | Sixth example | Seventh example | Eighth example |
|---|---|---|---|---|
| TTL/2ImgHT | 0.5675 | 0.5675 | 0.5675 | 0.5664 |
| f1/f | 0.9261 | 0.9265 | 0.9273 | 0.9299 |
| V1-V2 | 37.9000 | 37.9000 | 37.8000 | 37.9000 |
| V1-V3 | 32.2000 | 32.2000 | 0.3000 | 32.2000 |
| V1-V5 | 18.7000 | 18.7000 | 32.0000 | 18.7000 |
| f2/f | −3.1544 | −3.1485 | −3.1889 | −3.2394 |

TABLE 19-continued

| Conditional expression | Fifth example | Sixth example | Seventh example | Eighth example |
|---|---|---|---|---|
| f3/f | 4.1260 | 4.0898 | 4.1960 | 4.2675 |
| f4/f | −6.9357 | −6.8159 | −7.0532 | −7.2960 |
| f5/f | −3.1617 | −3.1893 | −3.1569 | −3.1177 |
| f6/f | 0.7602 | 0.7613 | 0.7648 | 0.7661 |
| f7/f | −0.6150 | −0.6154 | −0.6202 | −0.6220 |
| TTL/f | 1.1486 | 1.1486 | 1.1486 | 1.1463 |
| |f1/f2| | 0.2936 | 0.2943 | 0.2908 | 0.2871 |
| f2/f3 | −0.7645 | −0.7698 | −0.7600 | −0.7591 |
| BFL/f | 0.2198 | 0.2198 | 0.2199 | 0.2176 |
| D12/f | 0.0121 | 0.0122 | 0.0118 | 0.0113 |
| D12/D23 | 0.2571 | 0.2602 | 0.2477 | 0.2351 |
| D23/D34 | 0.9310 | 0.9252 | 0.9432 | 0.9487 |
| D56/D67 | 0.6367 | 0.6392 | 0.6368 | 0.6330 |

As set forth above, according to the various examples, an imaging lens system that can be mounted in a thinned portable electronic device may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a total of seven lenses with refractive power, the seven lenses comprising:
a first lens, a second lens, a third lens, a fourth lens, a fifth lens, a sixth lens, and a seventh lens sequentially disposed from an object side toward an imaging plane,
wherein the third lens comprises a convex image-side surface in a paraxial region,
wherein the fourth lens has negative refractive power,
wherein the fifth lens has negative refractive power, and
wherein a ratio (TTL/2ImgHT) between a distance (TTL) from an object-side surface of the first lens to an imaging plane and a diagonal length of the imaging plane (2ImgHT) is 0.6 or less.

2. The imaging lens system of claim 1, wherein the fourth lens comprises a concave image-side surface.

3. The imaging lens system of claim 1, wherein the fifth lens comprises a convex object-side surface.

4. The imaging lens system of claim 1, wherein the fifth lens comprises a concave image-side surface.

5. The imaging lens system of claim 1, wherein the sixth lens comprises a convex image-side surface.

6. The imaging lens system of claim 1, wherein the third lens has positive refractive power.

7. The imaging lens system of claim 1, wherein the sixth lens has positive refractive power.

8. The imaging lens system of claim 1, wherein

−4.0<f2/f<−1.0, where f is a focal length of the imaging lens system, and
f2 is a focal length of the second lens.

9. The imaging lens system of claim 1, wherein $3.0<f3/f$, where f is a focal length of the imaging lens system, and
f3 is a focal length of the third lens.

10. The imaging lens system of claim 1, wherein $f4/f<-3.0$, where f is a focal length of the imaging lens system, and
f4 is a focal length of the fourth lens.

11. The imaging lens system of claim 1, wherein $TTL/f<1.2$, where f is a focal length of the imaging lens system.

12. An imaging lens system, comprising:
a total of seven lenses with refractive power, the seven lenses comprising:
a first lens, a second lens, a third lens, a fourth lens, a fifth lens, a sixth lens, and a seventh lens, sequentially disposed from an object side toward an imaging plane,
wherein the third lens comprises a convex image-side surface in a paraxial region,
wherein the fourth lens comprises a concave image-side surface, and
wherein a ratio (TTL/2ImgHT) between a distance (TTL) from an object-side surface of the first lens to an imaging plane and a diagonal length (2ImgHT) of the imaging plane is 0.6 or less.

13. The imaging lens system of claim 12, wherein $-9.0<f4/f<-3.0$, where f is a focal length of the imaging lens system, and
f4 is a focal length of the fourth lens.

14. The imaging lens system of claim 12, wherein $-5.0<f5/f<-1.0$, where f is a focal length of the imaging lens system, and
f5 is a focal length of the fifth lens.

15. The imaging lens system of claim 12, wherein $0.84<D23/D34<0.96$, where D23 is a distance from an image-side surface of the second lens to an object-side surface of the third lens, and D34 is a distance from an image-side surface of the third lens to an object-side surface of the fourth lens.

16. The imaging lens system of claim 12, wherein $0.60<D56/D67<0.70$, where D56 is a distance from an image-side surface of the fifth lens to an object-side surface of the sixth lens, and D67 is a distance from an image-side surface of the sixth lens to an object-side surface of the seventh lens.

17. An imaging lens system, comprising:
a first lens, a second lens, a third lens, a fourth lens, a fifth lens, a sixth lens, and a seventh lens sequentially disposed from an object side toward an imaging plane,
wherein the third lens comprises a convex image-side surface in a paraxial region,
wherein the fourth lens has negative refractive power,
wherein the fifth lens has negative refractive power, and a convex object-side surface, and
wherein a ratio (TTL/2ImgHT) between a distance (TTL) from an object-side surface of the first lens to an imaging plane and a diagonal length of the imaging plane (2ImgHT) is 0.6 or less.

* * * * *